US011760398B2

(12) United States Patent
Cozza et al.

(10) Patent No.: US 11,760,398 B2
(45) Date of Patent: Sep. 19, 2023

(54) MODULAR GONDOLA MOVING SYSTEMS AND METHODS

(71) Applicant: Gondola Skate Moving Systems Inc., Santee, CA (US)

(72) Inventors: Frank Charles Cozza, Santee, CA (US); Gerry H. Taylor, Santee, CA (US)

(73) Assignee: GONDOLA SKATE MOVING SYSTEMS INC., Santee, CA (US)

( * ) Notice: Subject to any disclaimer, the term of this patent is extended or adjusted under 35 U.S.C. 154(b) by 0 days.

(21) Appl. No.: 17/750,507

(22) Filed: May 23, 2022

(65) Prior Publication Data

US 2022/0274634 A1 Sep. 1, 2022

Related U.S. Application Data

(62) Division of application No. 16/451,091, filed on Jun. 25, 2019, now Pat. No. 11,364,944.

(51) Int. Cl.
| | |
|---|---|
| *B62B 3/00* | (2006.01) |
| *B62B 5/06* | (2006.01) |
| *B62B 3/04* | (2006.01) |
| *B66F 5/02* | (2006.01) |
| *B62B 3/02* | (2006.01) |

(52) U.S. Cl.
CPC ............. *B62B 3/008* (2013.01); *B62B 3/02* (2013.01); *B62B 3/04* (2013.01); *B62B 5/06* (2013.01); *B66F 5/02* (2013.01); *B62B 2202/30* (2013.01)

(58) Field of Classification Search
CPC .............................. B62B 3/008; B62B 5/0086
See application file for complete search history.

(56) References Cited

U.S. PATENT DOCUMENTS

| | | | | |
|---|---|---|---|---|
| 2,915,776 | A | 12/1959 | Hanson et al. | |
| 3,246,910 | A * | 4/1966 | Chura | B62B 3/008 |
| | | | | 280/104 |
| 4,722,511 | A * | 2/1988 | Chitwood | B66F 9/06 |
| | | | | 254/7 R |
| 5,080,390 | A * | 1/1992 | Ashworth | B60G 21/04 |
| | | | | 280/124.135 |
| 5,344,278 | A * | 9/1994 | Emig, Jr. | B66F 9/184 |
| | | | | 294/119.2 |

(Continued)

FOREIGN PATENT DOCUMENTS

WO  2019035868 A1  2/2019

*Primary Examiner* — Jonathan Snelting
(74) *Attorney, Agent, or Firm* — Hahn Loeser & Parks LLP

(57) ABSTRACT

Examples include systems and methods for lifting and moving gondolas using a modular gondola moving system. Components of a modular gondola moving system include interchangeable skates. The interchangeable skates are further removably attached to a longitudinal member which, when connected to the longitudinal member, form a skate system. Multiple skate systems are positioned to the underside of a gondola and may additionally be connected together by connector bars for stabilization and to form the modular gondola moving system. One or more lifting devices are provided independent of and are used in combination with each skate system for positioning the gondola on each skate system. The one or more lifting devices may be repeatedly used in order to place the gondola on a single modular gondola support system.

20 Claims, 30 Drawing Sheets

(56) References Cited

U.S. PATENT DOCUMENTS

| | | |
|---|---|---|
| 5,486,014 A | 1/1996 | Hough |
| 5,716,186 A | 2/1998 | Jensen et al. |
| 5,937,959 A * | 8/1999 | Fujii ............... A61G 5/047 180/12 |
| 6,095,537 A | 8/2000 | Cozza et al. |
| 7,114,732 B1 * | 10/2006 | Ismail ............... B60D 1/00 280/47.35 |
| 8,317,451 B2 | 11/2012 | Cozza |
| 8,672,296 B2 | 3/2014 | Cozza et al. |
| 8,794,899 B2 | 8/2014 | Cozza et al. |
| 8,967,592 B2 | 3/2015 | Cozza et al. |
| 9,045,153 B2 | 6/2015 | Cozza et al. |
| 9,248,698 B2 | 2/2016 | McKinnon et al. |
| 9,327,954 B2 | 5/2016 | Cozza et al. |
| 9,522,816 B2 | 12/2016 | Taylor |
| 9,624,078 B2 | 4/2017 | Cozza |
| 10,059,574 B2 | 8/2018 | Walsh |
| 2003/0215314 A1 | 11/2003 | Klokke |
| 2004/0021280 A1 | 2/2004 | Peggs |
| 2007/0059138 A1 | 3/2007 | Cozza |
| 2013/0154216 A1 | 6/2013 | Paulk, Sr. et al. |
| 2018/0050715 A1 | 2/2018 | Cozza et al. |

* cited by examiner

MODULAR GONDOLA MOVING SYSTEMS AND METHODS

This application is a divisional of, and claims priority to and benefit of, U.S. application Ser. No. 16/451,091, filed Jun. 25, 2019 with the U.S. Patent Office, which is hereby incorporated by reference.

FIELD

Examples described herein relate generally to lifting and moving systems for gondolas, storage racks, and the like. The lifting and moving systems allow for lifting and/or relocating the gondolas and storage racks while loaded or stocked.

DESCRIPTION OF THE RELATED ART

Display structures and storage racks, also known as gondolas, are used for both storage solutions, such as in a warehouse setting, and for displaying merchandise, such as in a consumer setting. Gondolas, as used herein, include any rack or shelving structure having shelves supported by vertical members extending from horizontal supports at a base. Gondolas, for example, may include pallet racks, storage racks, display racks, and the like.

Gondolas are positioned on a support surface, or floor, where a pathway, or aisle, may be provided between gondolas. On occasion, it is necessary to move, lift, and/or relocate one or more gondolas. Such an occasion may be necessary to perform activities such as maintenance, cleaning, reorganizing, repurposing, or the like.

Many obstacles are encountered when moving a gondola. Such obstacles include handling stocked gondolas within limited space and with limited resources. By example, disassembly of a gondola and/or unstocking or relocating the materials from a gondola, such as merchandise, requires a significant expenditure of resources and time.

To address the aforementioned obstacles, a number of different gondola moving systems have been developed. For example, systems have been developed which cradle the horizontal support members of a gondola. Lifting and moving mechanisms are further attached to these cradling structures for lifting and moving the gondola. An example of such a system is disclosed by U.S. Pat. No. 8,672,296 to Cozza, et. al. Other systems have been developed to integrate with or directly connect to the gondola for lifting or moving a gondola. An example of such a system is disclosed by U.S. Pat. No. 5,716,186 to Jensen, et. al. These prior systems, however, present additional obstacles. By example, these prior systems not only require clearing and/or disassembly of several gondola shelves they also require assembly and disassembly of the gondola moving system in order to either cradle the horizontal support members and/or to integrate with or connect to the gondola. Further, the prior systems fail to support the entire base of the gondola and thereby creating an unstable load with the potential of twisting and/or binding the gondola. In particular, prior systems suspend the mid-point of a gondola during lifting and moving. Moreover, these systems require the lifting mechanism remains attached as a component of the support structure, thereby, requiring numerous lifting mechanisms.

Accordingly, a need remains to provide a gondola moving system for lifting and moving of a gondola while stocked. Further, a need also remains to increase the safety and efficiency of a gondola moving system.

SUMMARY

Disclosed herein are gondola moving systems and devices which are modular. Also disclosed are methods for assembly and use of the gondola moving systems and devices.

An exemplary system for moving gondolas includes a first skate system. The first skate system comprises a first skate, a second skate, and a third skate. Each skate engages a ground surface and is connected in a lateral arrangement along a length of a longitudinal member. Each of the first skate, the second skate, and the third skate extends across a width of the longitudinal member. The first skate, the second skate, and the third skate each comprises at least four casters which engage the ground surface. A first pair of the four casters is positioned to a first side of the longitudinal member and a second pair of the four casters is positioned to a second side of the longitudinal member. The longitudinal member is additionally positioned on a bearing surface of each of the first skate, the second skate, and the third skate.

Each skate of the first skate system may additionally comprise at least one pull ring receiver. The pull ring receiver is for receiving a removable pull ring wherein the pull ring receiver extends from a body of the skate in the direction extending the length of the member. The pull ring receiver may be further positioned entirely below the longitudinal member. One example of a means for the pull ring receiver to receive the removable pull ring is the pull ring may be connected to the pull ring receiver by way of a compression fitting. The removable pull ring may rotate in a respective pull ring receiver when secured to the pull ring receiver. In some examples a receiver end of the pull ring rotates to opposing sides of a width of the longitudinal member and thereby is clear of a cross-section of the longitudinal member when at the opposing sides. When the pull ring is in use and the skate system is pulled by the pull ring, each of the at least four casters of the first skate, the second skate, and the third skate maintain a direction of travel in the same direction as the direction of travel of the pull ring. Other examples of a means for the pull ring receiver to receive the removable pull ring include a bolted connection, a mating connection, a hitch, or the like.

In some examples, a second skate system is provided, same as the first. The second skate system may be used in combination with the first skate system to move the gondola. To move a gondola, the gondola is placed upon the first skate system and the second skate system such that feet of the gondola are bearing on one of the at least first skate, second skate, and/or third skate of each of the first skate system and the second skate system. The first skate system and the second skate system may be parallel to one another. The first skate system and the second skate system may be connected to one another by way of a one or more connector bars.

One or more lifting devices may be relied on to place the gondola on the first skate system and/or the second skate system. The lifting device comprises a lifting mechanism supported on two opposing bases. The lifting mechanism comprises a lift face centrally positioned between the two opposing bases. The two opposing bases comprise a suspension system. The two opposing bases may additionally comprise at least two multi-directional wheels extending from the suspension system. The suspension system lowers the elevation of each opposing base as a load is applied to the lifting mechanism. More specifically, the suspension system lowers each opposing base to a ground surface as the lifting mechanism raises. A yoke may be further attached to the lift face of the lifting mechanism. The yoke may be attached by way of a dovetail structure where the yoke moves vertically along a length of the dovetail structure. The yoke may be removably connected to the dovetail structure of the lifting mechanism. The lifting mechanism may move the lift face and/or the yoke by way of a ram extending from a hydraulic assembly wherein the hydraulic assembly is secured to a handle of the lifting device. In some examples, the lifting mechanism moves the yoke in a vertical direction only. The lifting mechanism elevates the lifting face within and/or to above a void formed between the two opposing bases.

When in use the two opposing bases are positioned to opposing sides of a foot of a gondola. The lifting mechanism, by way of the yoke, is engaged with the gondola for lifting the gondola. The lifting mechanism raises the gondola and allows a skate system to be inserted through the void to an underside of an elevated gondola. The lifting mechanism may then lower the gondola onto the skate system. The lifting device is then separated from the gondola and the gondola may be positioned upon the skate system(s).

An exemplary method for moving gondolas comprises the following steps:
- assembling a first skate system comprising at least two skates connected along a length of a longitudinal member;
- attaching a lifting mechanism to a frame of the shelving unit using a lifting device, the lifting system comprising the lifting mechanism;
- applying a load of the shelving unit to the lifting mechanism by raising the lifting mechanism;
- raising the lifting mechanism and the shelving unit to above a void formed through the lifting device;
- inserting the first skate system in through the void to below the shelving unit wherein the shelving unit comprises one or more feet and one of the one more feet of the shelving unit is positioned above each of the at least two skates of the first skate system; and
- lowering the shelving unit onto the first skate system wherein one of the one or more feet is positioned and supported on a bearing surface of each of the at least two skates by lowering the lifting mechanism.

The foregoing and other objects, features, and advantages will be apparent from the following more detailed descriptions of particular examples, as illustrated in the accompanying drawings wherein like reference numbers represent like parts of the invention.

BRIEF DESCRIPTION OF THE DRAWINGS

Reference is made to the accompanying drawings in which particular examples and further benefits of the examples are illustrated as described in more detail in the descriptions below, in which.

DETAILED DESCRIPTION OF PARTICULAR EXAMPLES

As will be illustrated in greater detail below, the modular gondola moving system of the present disclosure sets out to provide a system that increases efficiency of mobilization and transport and is further modifiable. Each of the components of the present modular gondola support system are adjustable and interchangeable to provide a modular kit system that is compatible with gondolas of various sizes and construction. The present modular gondola moving system also sets out to provide a more stable support platform for supporting a gondola and/or even becoming a permanent component of the gondola for continued use over time. These advantages are accomplished by providing independently supported skates which are connected together. The system of independently supported skates provide a gondola moving system supported on an increased number of wheels which may be strategically positioned at vertical point loads of a gondola. The wheels of the independently supported skates reduce the load at each skate and/or wheel and provide an increased ability to change direction or initiate momentum. The present modular gondola support system additionally provides a gondola support system which does not leave any vertical point loads of a gondola suspended and supports the gondola on a system which transfers each of these vertical point loads directly to the support surface, or floor. The present modular gondola moving system also provides for a connector bar system that stabilizes the skate systems as well as the gondola.

Components of a modular gondola moving system include interchangeable skates. The interchangeable skates are further removably attached to a longitudinal member. When the skates are connected to the longitudinal member they form a skate system. Multiple skate systems are positioned to the underside of a gondola and may additionally be connected together by connector bars for stabilization and to form the modular gondola moving system. One or more lifting devices are provided independent of, and are used in combination with, each skate system for positioning the gondola on each skate system. The one or more lifting devices may be repeatedly used in order to place the gondola on a single modular gondola support system. Features of the above components are modifiable for adjustment onsite by way of toolless construction. Means for a toolless connection or construction include gravity fed connections, finger tight fittings, cotter pin connections, set screw fittings, wing nuts, locking pins, leaf springs, or the like. The above components are additionally interchangeable to accommodate onsite adjustment, repair, and/or replacement. Each of the features of the above components will now be discussed in greater detail in view of the figures. Methods for assembly and use of the above components additionally follow.

Skate System

Figure 1:
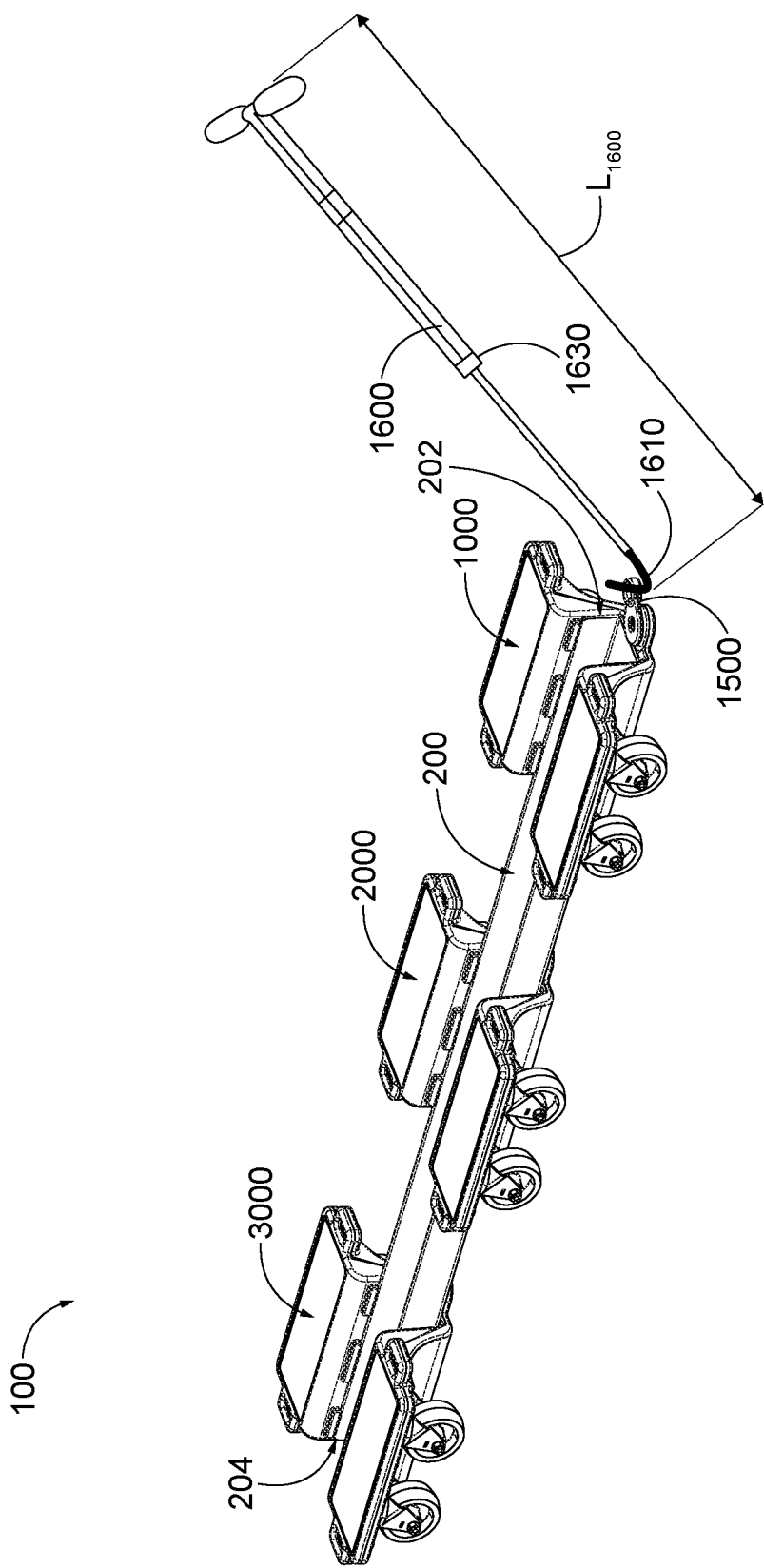
FIG. 1 is a perspective view of a skate system, in accordance with an example.
Figure 2:
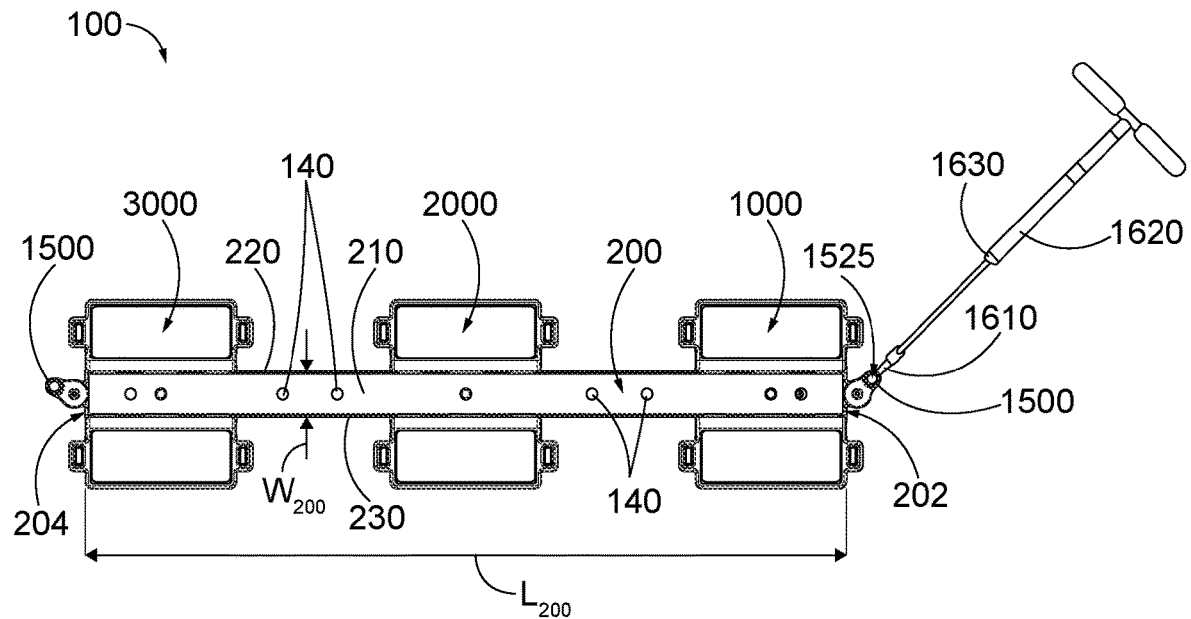
FIG. 2 is a top view of a skate system, in accordance with an example.
Figure 3:
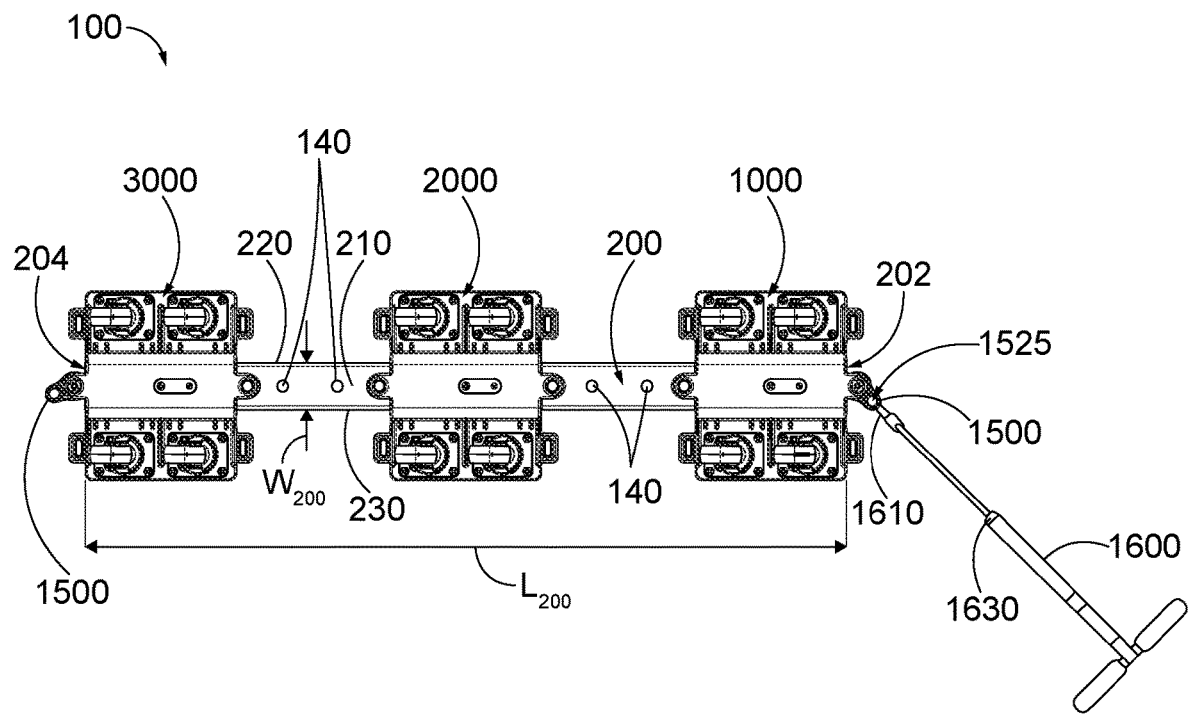
FIG. 3 is a bottom view of a skate system, in accordance with an example.

Turning to FIG. 1, a skate system 100 having a first skate 1000, a second skate 2000, and a third skate 3000 is illustrated. Each skate 1000, 2000, 3000 is connected to one another longitudinally by way of a longitudinal member 200. In this particular example, skate 1000 and skate 3000 may also be referred to as end skates as they are positioned at respective longitudinal ends 202, 204 of the longitudinal member 200. Skate 2000 may also be referred to as an intermediate skate as it is positioned between the longitudinal ends 202, 204 of the longitudinal member. Skates may be positioned at any point along a length $L_{200}$ of a longitudinal member 200. In one example, skates may be evenly positioned along a length $L_{200}$ of a longitudinal member (the length $L_{200}$ as illustrated by FIGS. 2-3). In yet another example, skates may be unevenly positioned along a length $L_{200}$ of a longitudinal member 200 (the length $L_{200}$ as illustrated by FIGS. 2-3). Skates may be positioned along the length $L_{200}$ of a longitudinal member to be located at a point load of the gondola and, in some examples, at each point load of the gondola (the length $L_{200}$ as illustrated by FIGS. 2-3). Also illustrated by FIG. 1 is a pull bar 1600 removably attached to a pull ring 1500 of the first skate 1000.

Figure 4:
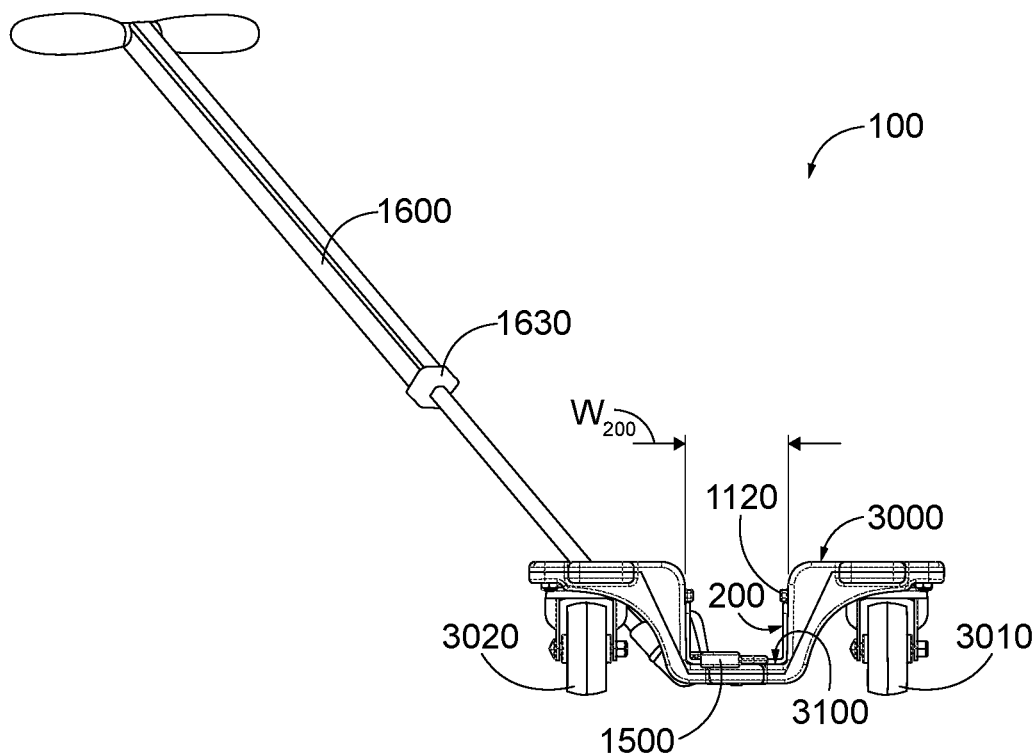
FIG. 4 is an end view of a skate system, in accordance with an example.
Figure 5:
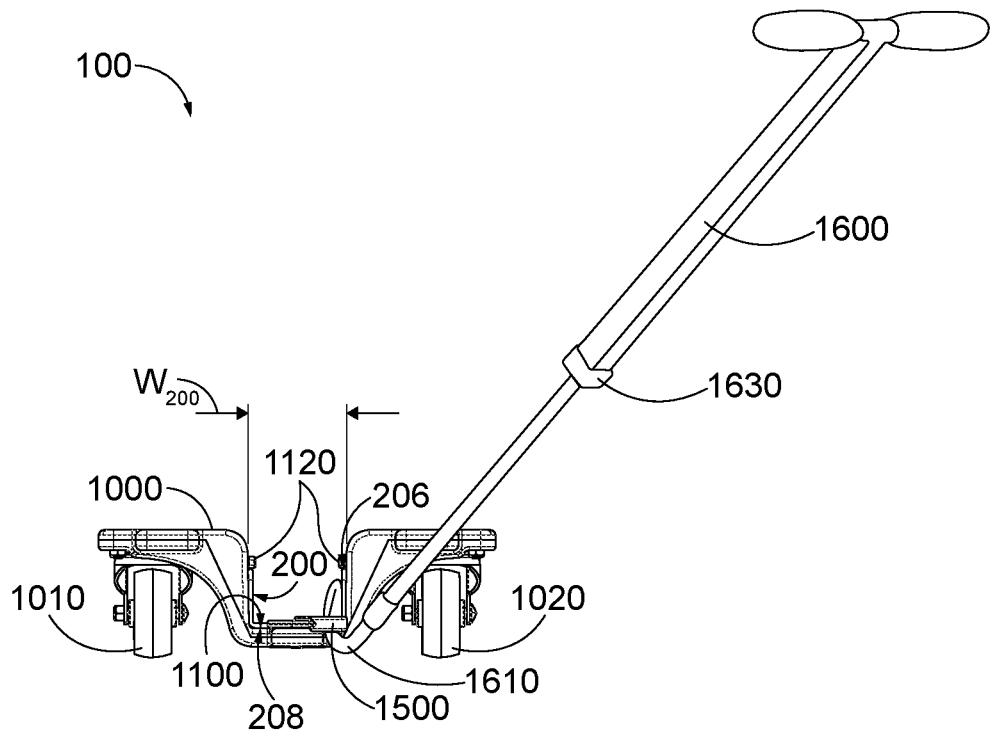
FIG. 5 is an end view of a skate system, in accordance with an example.

FIGS. 2-3 illustrates a top side and a bottom side view, respectively, of the skate system 100 of FIG. 1. The longitudinal member 200 of this example is a channel comprising a web 210 having a first flange 220 and a second flange 230 at each opposing end of the channel width $W_{200}$. The longitudinal member 200 further comprises a length $L_{200}$ extending in the longitudinal direction. With particular reference to the first skate 1000, the longitudinal member is positioned within a seat 1100 of the skate where the skate extends across the width $W_{200}$ of the longitudinal member 200, supporting the longitudinal member 200 centrally on the skate 1000. As illustrated by FIG. 5 the seat 1100 is recessed within the skate 1000, thereby, providing a low profile and low center of gravity. Seats are additionally provided on the second skate 2000 and third skate 3000, respectively, with the first skate 1000 relied on herein as an exemplary example. As illustrated by FIG. 4 seat 3100 is additionally recessed at third skate 3000. As illustrated by FIG. 5, the recessed seats 1100 are recessed between opposing casters 1010, 1020 of the first skate 1000 such that the longitudinal member 200 is recessed between the opposing casters 1010, 1020. In one example, a bottom side of the longitudinal member is recessed below a top side of each caster. FIG. 4 illustrates the same with respect to opposing casters 3010, 3020 of the third skate 3000.

Figure 6:
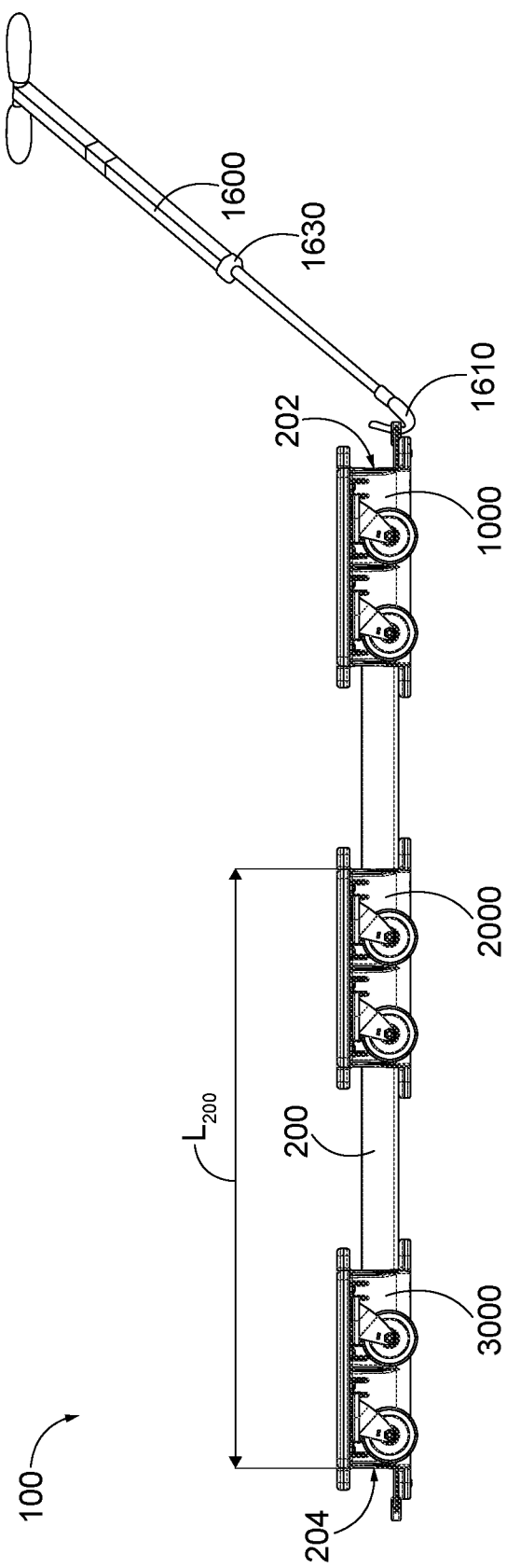
FIG. 6 is a side view of a skate system, in accordance with an example.

Turning now to FIG. 6, a side view of the skate system 100 is illustrated. The first skate 1000, the second skate 2000, and the third skate 3000 are illustrated. The first skate 1000 is positioned to a first longitudinal end 202 of the longitudinal member 200 and the third skate 3000 is positioned to a second longitudinal end 204 of the longitudinal member 200. The second skate 2000 is positioned between the first skate 1000 and the third skate 3000 relative the length $L_{200}$ of the longitudinal member 200. In this example, the second skate 2000 is positioned to the center of the length $L_{200}$ of the longitudinal member 200. It is appreciated herein that fewer or more skates may be provided along the length $L_{200}$ of the longitudinal member.

Skates

Figure 7:
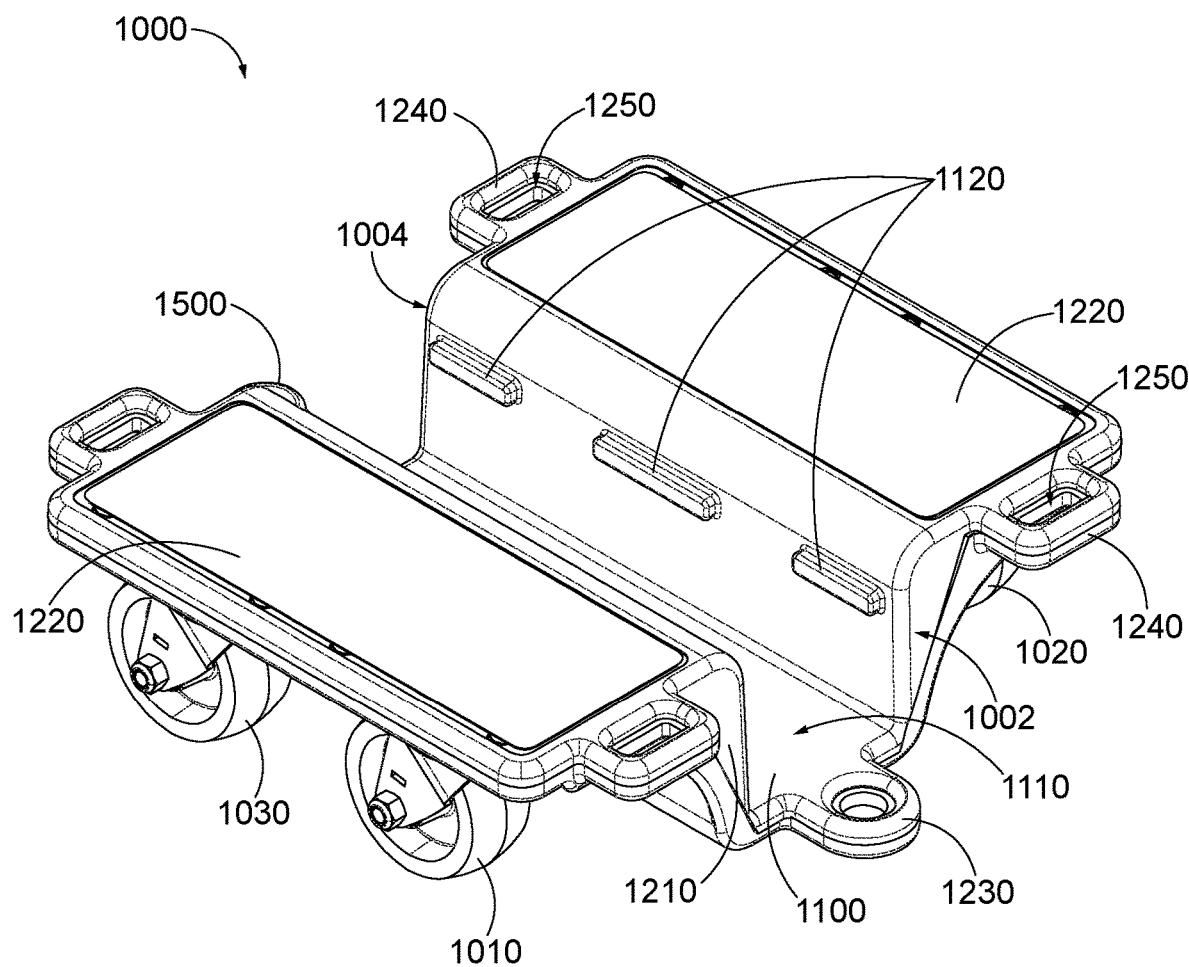
FIG. 7 is a perspective view of a skate, in accordance with an example.

FIG. 7 illustrates an exemplary skate 1000. A skate 1000 comprises a bearing surface 1110. The bearing surface is located on the seat 1100 of the skate 1000. The bearing surface provides a central support between at least two opposing casters 1010, 1020. As illustrated by the bottom view of the skate in FIG. 9 the bearing surface is between two pairs of opposing casters 1010, 1020 and 1030, 1040. In other words, a first pair of at least four casters is positioned to a first side of the longitudinal member and a second pair of the four casters is positioned to a second side of the longitudinal member, the second side opposite the first side. By providing four casters, the skate 1000 is self-supportive on a support surface, or floor, and a vertical point load of a gondola (as will be discussed in greater detail below) is isolated to the skate. This is in contrast to applying a vertical point load of a gondola to a cantilevered member, such as a longitudinal member alone. In some examples of the present disclosure the longitudinal member is not relied on to carry a vertical point load or to provide support to a vertical point load. In other words, the longitudinal member, as described above, does not support, or carry, the point load of a gondola when in use.

Still referring to FIG. 7, the seat 1100 of the skate 1000 is shaped to receive the longitudinal member. The longitudinal member may be a channel, as discussed above, or may be any other configuration such as, for example, a flat plate, a tube, a truss structure, or the like. In the present example, wherein the longitudinal member is a channel, the channel is positioned within the seat 1100 and is removably secured to the skate 1000 between opposing casters. The channel may be inserted from a first end 1002 toward a second end 1004 of the skate 1000. The skate of FIG. 7 further comprises one or more tabs 1120 for securing a longitudinal member within the seat 1100. The tabs one or more tabs are an example of a means for securing a longitudinal member within the seat 1100. Other examples of such a means include a through-bolt connection, locking pin, adhesive, any other mechanical connection, or the like. With respect to the tabs, the one or more tabs may be over-molded onto the chassis of the skate. In yet another example, the one or more tabs may be an extension of the frame. Referring back to FIGS. 4-5, the longitudinal member 200 is secured vertically within the seat 1100 by way of the one or more tabs 1120 positioned to a top side 206 of the longitudinal member 200 where a bottom side 208 of the longitudinal member 200 is positioned on the bearing surface 1110 of the seat 1100. In this particular example, the top side 206 of the longitudinal member 200 is the outer most extent of the first flange 220 and the second flange 230 of the channel. The channel is locked in its vertical position by the one or more tabs 1120. Still, the channel, or longitudinal member 200, may slide horizontally within the seat 1100 of the skate 1000 until the seat 1100 is properly positioned to receive a point load of a gondola. As illustrated by the end views of the skate 1000 of FIGS. 10-11, the tabs 1120 are positioned to opposing lateral sides of the seat 1100 to evenly secure the longitudinal member within the seat 1100.

Figure 8:
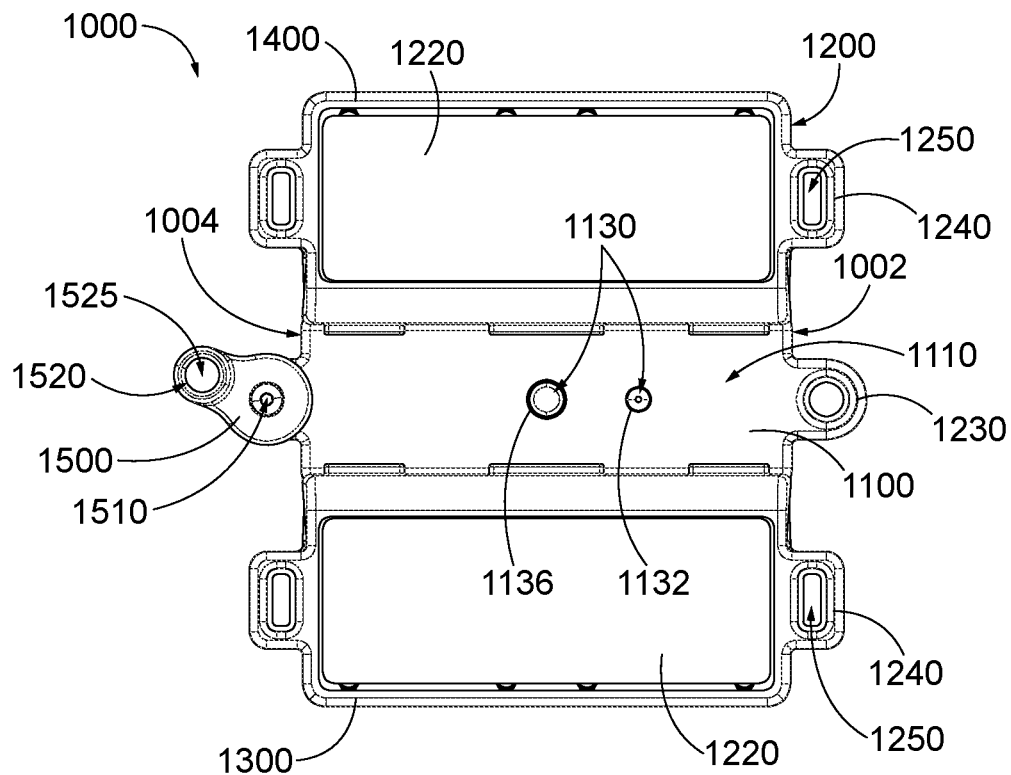
FIG. 8 is a top view of a skate, in accordance with an example.
Figure 9:
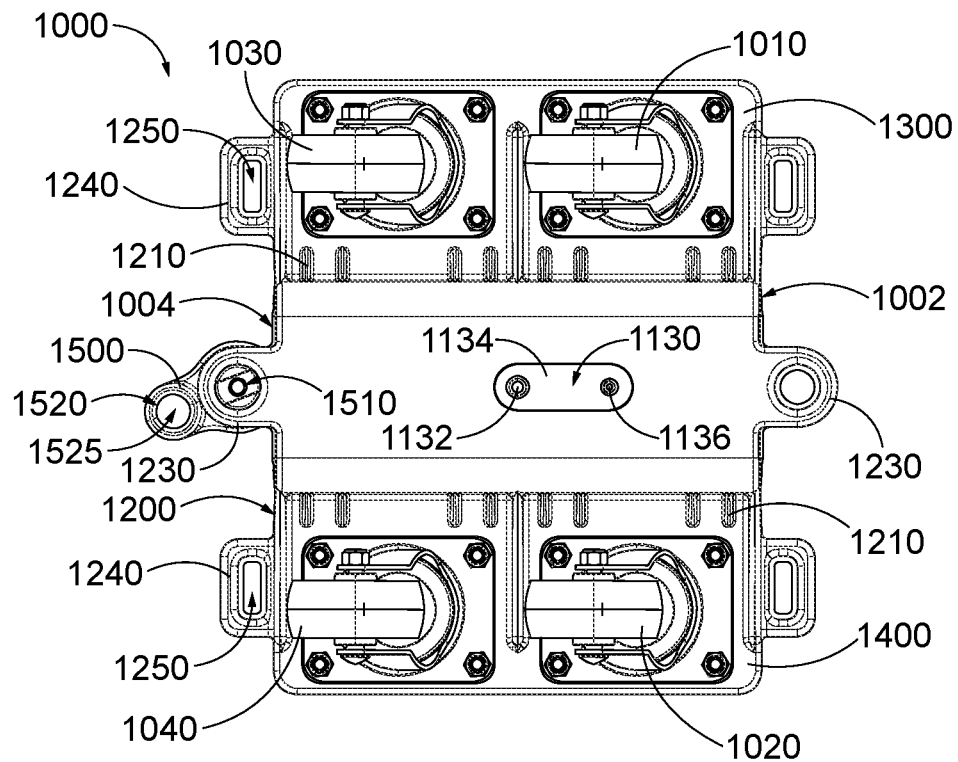
FIG. 9 is a bottom view of a skate, in accordance with an example.

The longitudinal member may additionally be secured within the seat horizontally once the skate 1000 is appropriately positioned along the length $L_{200}$ of the longitudinal member 200, as illustrated by FIGS. 1-3 and 6. As illustrated by FIGS. 8-9, a locking mechanism 1130 is provided at the seat 1100 of the skate 1000 as a means for securing the longitudinal member horizontally within the respective skate. In this particular example, the locking mechanism is a leaf spring 1132 relied on to drive a pin 1136 in through an aperture extending through the longitudinal member. The leaf spring 1132 removably drives a channel release button 1134 into an aperture in the longitudinal member for securing the longitudinal member horizontally within the respective skate. The leaf spring 1132 is controlled by way of the channel release button 1134. The channel release button 1134 may be positioned to the bottom side of the seat 1100 of the skate 1000 with the pin extending through the seat 1100 of the skate and into a longitudinal member when a longitudinal member is positioned in the seat 1100. Upon pressing the release button 1134, the leaf spring 1132 disengages the pin 1136 from the aperture in the longitudinal member, thereby, freeing the longitudinal member in a horizontal direction relative the skate 1000. The leaf spring 1132 connection allows for ease in modifying and/or repairing in service skates and for minimized service time by easily removing and/or replacing a skate on a longitudinal member. Other examples of means for securing the longitudinal member horizontally within the skate may include one or more tabs, a through-bolt connection, a locking pin, adhesive, or any other mechanical connection, or the like.

Still referring to FIGS. 8-9, the chassis 1200 of the skate 1000 extends from the seat 1100 to caster frames 1400, 1500 for supporting the casters 1010, 1020, 1030, and 1040. The caster frames 1400, 1500 extend from each lateral side of the seat 1100. By way of the casters, the caster frames 1400, 1500 support the seat 1100 and the bearing surface 1110. In other words, the vertical point load of the gondola is transferred from the bearing surface 1110 of the seat 1100 to the caster frames 1400, 1500 and onto the support surface, or floor, by way of the casters, 1010, 1020, 1030, and 1040. The casters 1010, 1020, 1030, and 1040 may additionally be swivel plate casters which not only rotate to impart travel but additionally rotate relative to the skate to move in a direction normal to the direction of travel. Means for the casters to maintain a direction of travel include such the aforementioned swivel plate caster, an onmi-directional caster, a combination of axles and/or joints, or the like. In the examples illustrated by FIGS. 8-9, the casters are attached to the chassis 1200 of the skate 1000 by way of a bolted connection. The casters may be attached to the chassis in any manner as known by one of ordinary skill in the art such as, but not limited to, rivets, welds, adhesive, or the like. In an alternative example, the casters may be one or more feet, plates, or the like for supporting and/or moving the skate on the support surface. In yet another example, the casters may be provided in combination with one or more feet, plates, or the like in order to immobilize the skate on the support surface. To this end, the casters may additionally, or alternatively, include a brake.

In particular examples, the chassis 1200 of the skate 1000 is constructed of formed metal. The formed metal may be plated with zinc chromate for corrosion resistance, may be carbon steel, may be cast steel, the like, or any combination thereof. It is also appreciated herein the chassis may additionally or alternatively be formed of a polymer or composite material including, but not limited to, carbon fiber, high density plastic, etc. The formed metal, or chassis, may additionally or alternatively be over-molded in plastic. The over-molded exterior may be applied by way of injection molding. The over-molded exterior may contiguously engage each surface of the metal frame thereby at least partially encasing the frame such that no adhesive is utilized to adhere the over-molded exterior to the metal frame. The over-molded plastic provides a protective coating which is aesthetically pleasing. The protective coating may be applied to provide a resilient texture for reducing damage to other components or an operator. To this end the protective coating reduces any impact when contacting another component or an operator in comparison to impacting metal, directly. In one example, the entire chassis is over-molded and encapsulated in the over-molded plastic. The metal is, thereby, encased in the over-molded plastic and is framed to secure the metal frame within the over-molded plastic. This is in contrast to adhering or mechanically fastening a plastic exterior to separate components of the formed metal frame. In other words, in some examples the over-molded plastic is not independently adhered to the chassis. One or more stand-off sections 1220 of the chassis may still remain uncoated by the protective coating, or devoid of the protective coating. Stand-off sections 1220 are sections of the chassis 1200 of the skate 1000 which remain uncoated by the protective coating. The stand-off sections create locations which allow modification to or usage of the metal chassis 1200 for other purposes. By example, the stand-off sections 1220 provide an attachment or support location for when the chassis undergoes the plastic over-molding process from which the chassis may be secured to and/or suspended during the over-molding process. Further, the stand-off sections 1220 may be strategically positioned so the casters or labels may be secured directly to the formed metal frame after the plastic over-molding process has been completed. Still yet, stand-off sections may be provided at components that may require continued maintenance, such as at caster bolts, pull ring receiver, and/or other connections, so these features may be easily removed, replaced, and or maintained. As indicated above, these same stand-off sections may be the location of attachment or support required for handling the chassis during the over-molding process. Additionally or alternatively, stand-off sections may be created by masking the stand-off locations prior to the over-molding process. In one example, the stand-off sections are isolated to the surfaces of the chassis 1200 and do not encompass a corner, edge, and/or transition of the chassis 1200. In other words, all corners, edges, and/or transitions of the chassis are coated by an over-molded plastic protective coating.

Figure 10:
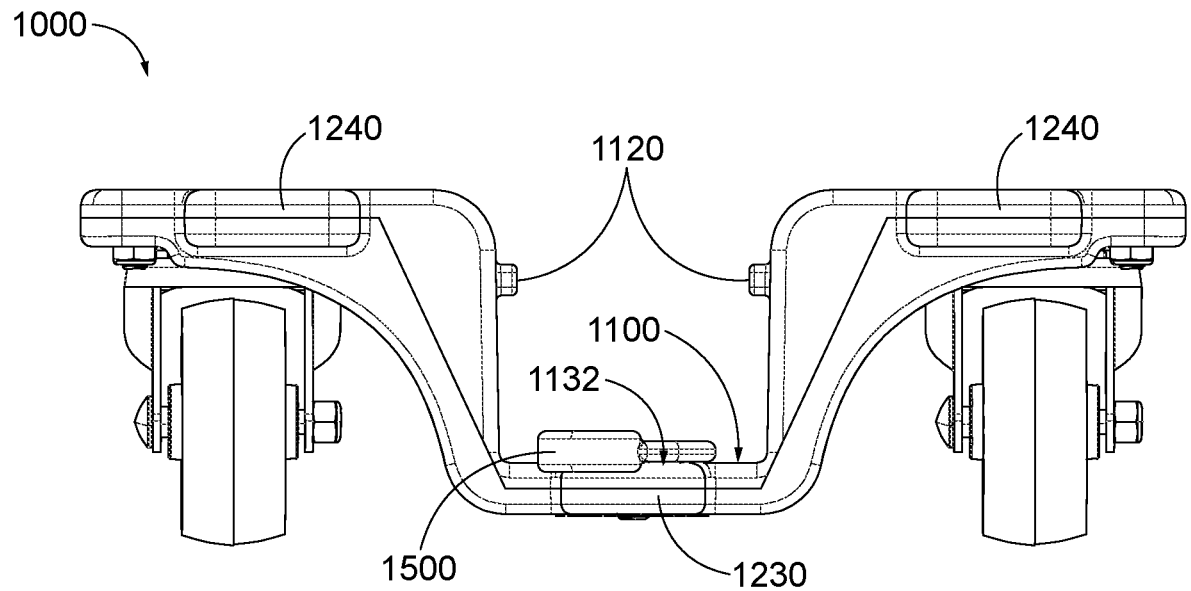
FIG. 10 is an end view of a skate, in accordance with an example.
Figure 11:
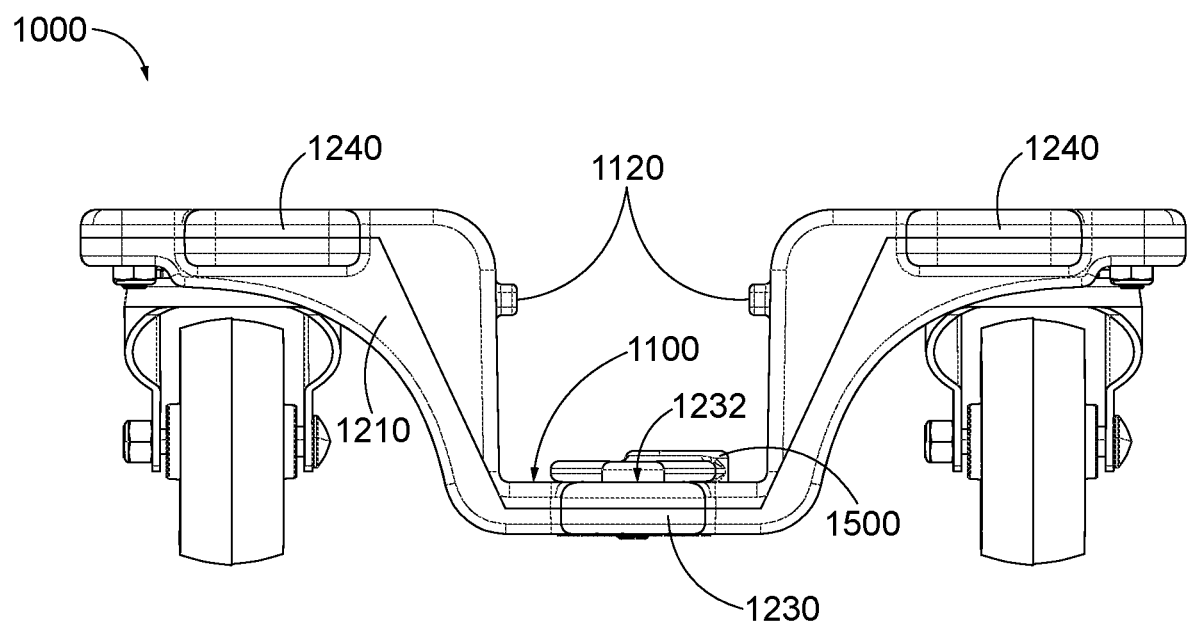
FIG. 11 is an end view of a skate, in accordance with an example.
Figure 12:
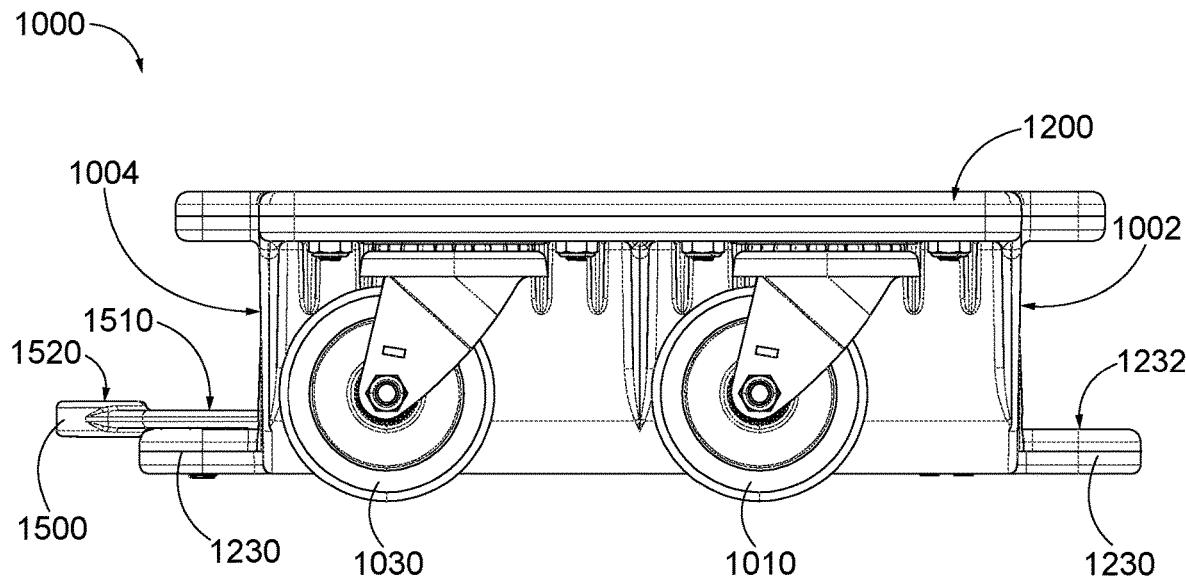
FIG. 12 is a side view of a skate, in accordance with an example.
Figure 13:
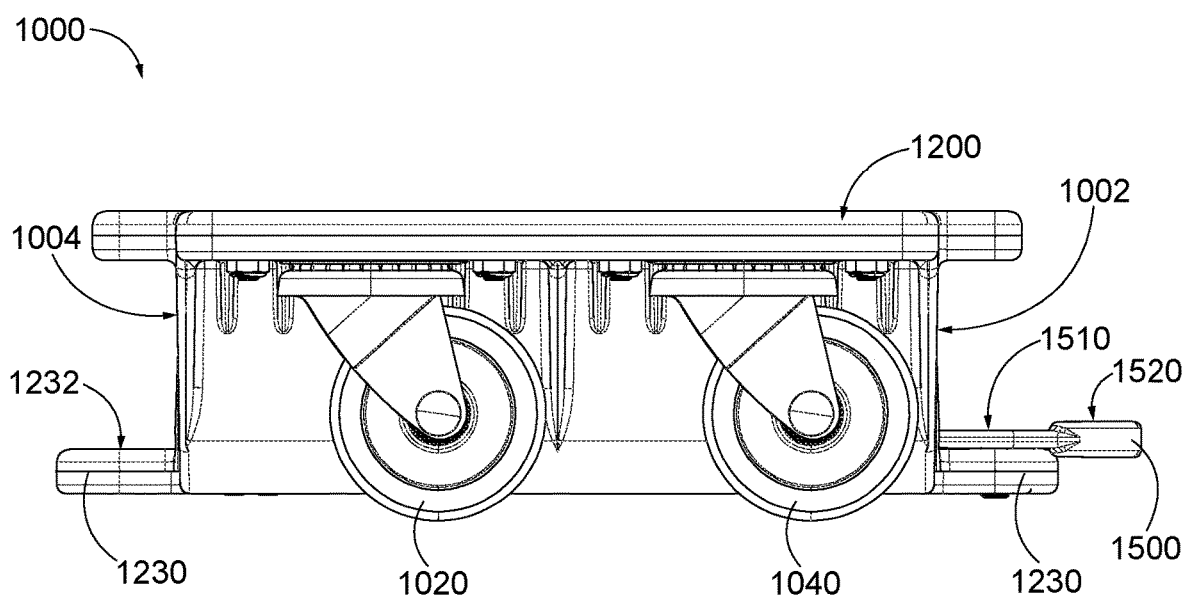
FIG. 13 is a side view of a skate, in accordance with an example.
Figure 14:
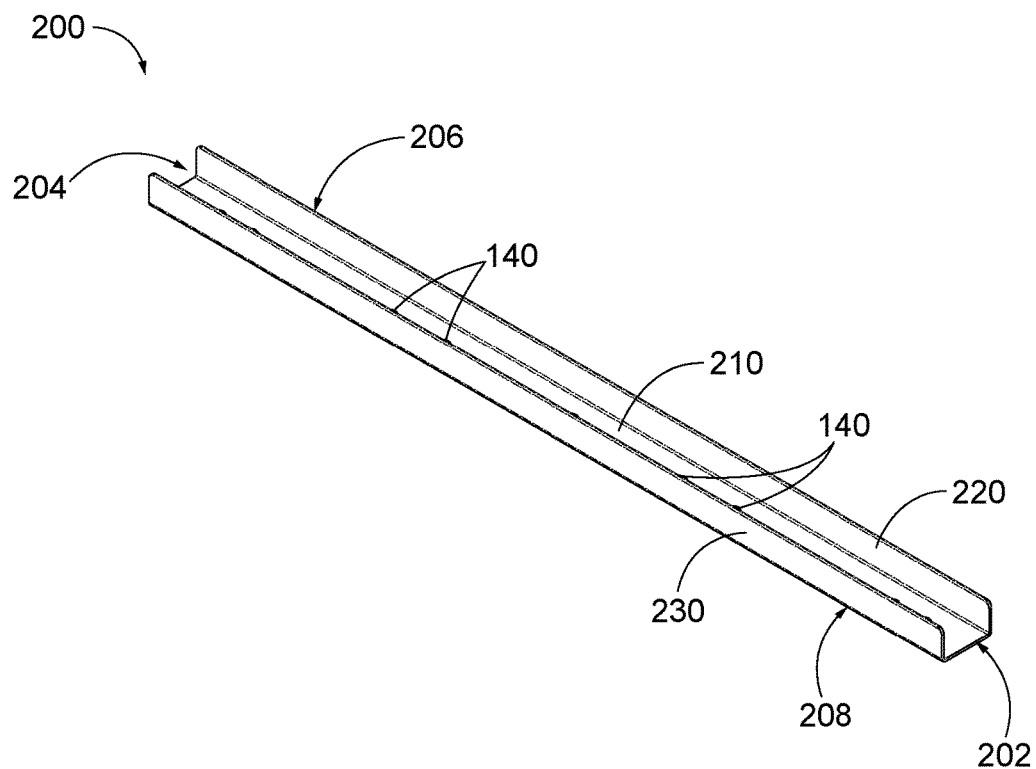
FIG. 14 is a perspective view of a longitudinal member, in accordance with an example.
Figure 15:
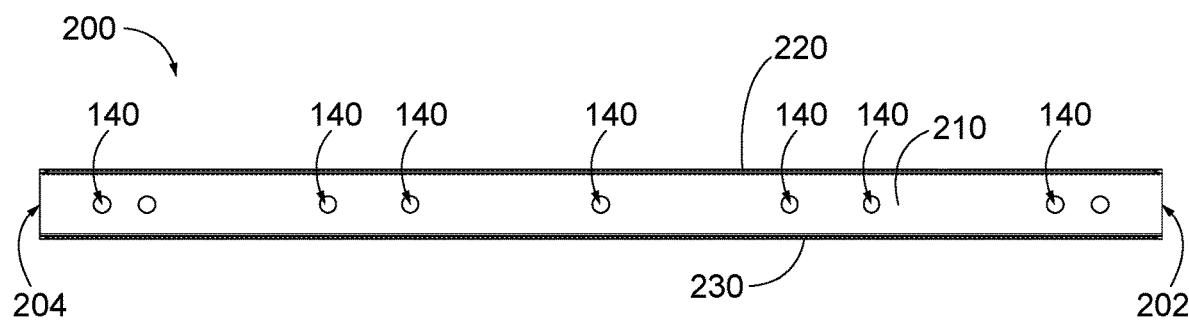
FIG. 15 is a top view of a longitudinal member, in accordance with an example.
Figure 16:
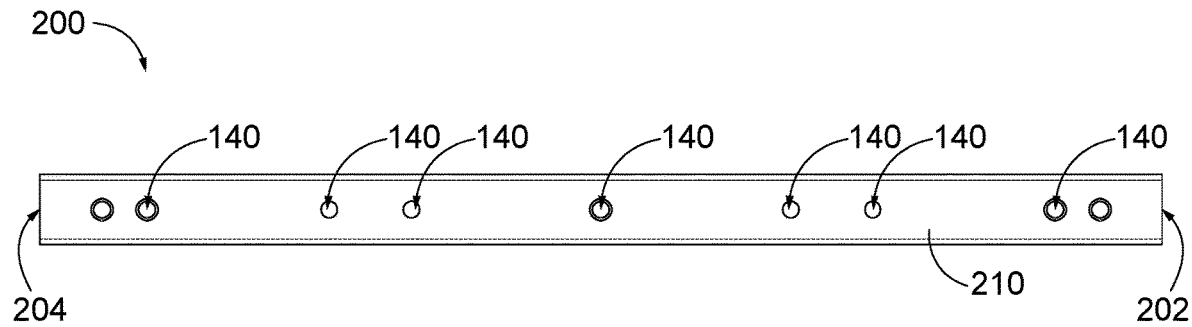
FIG. 16 is a bottom view of a longitudinal member, in accordance with an example.
Figure 17:
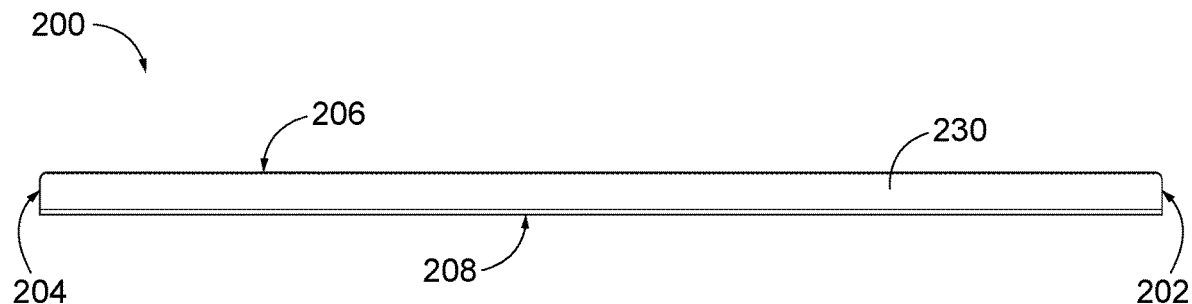
FIG. 17 is a side view of a longitudinal member, in accordance with an example.
Figure 18:
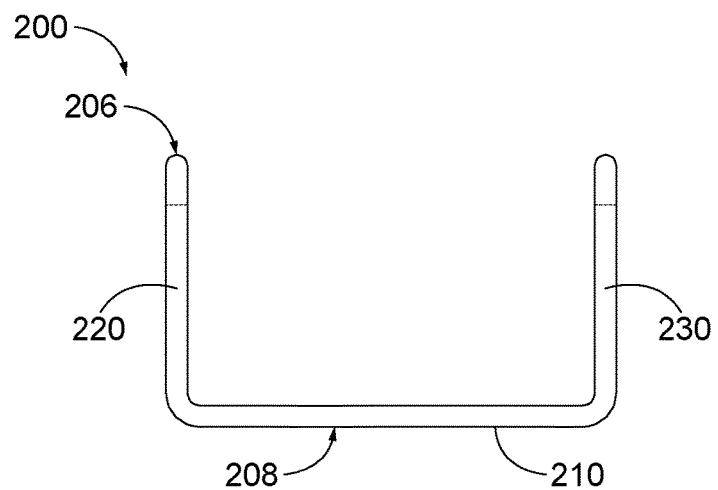
FIG. 18 is an end view of a longitudinal member, in accordance with an example.
Figure 19:
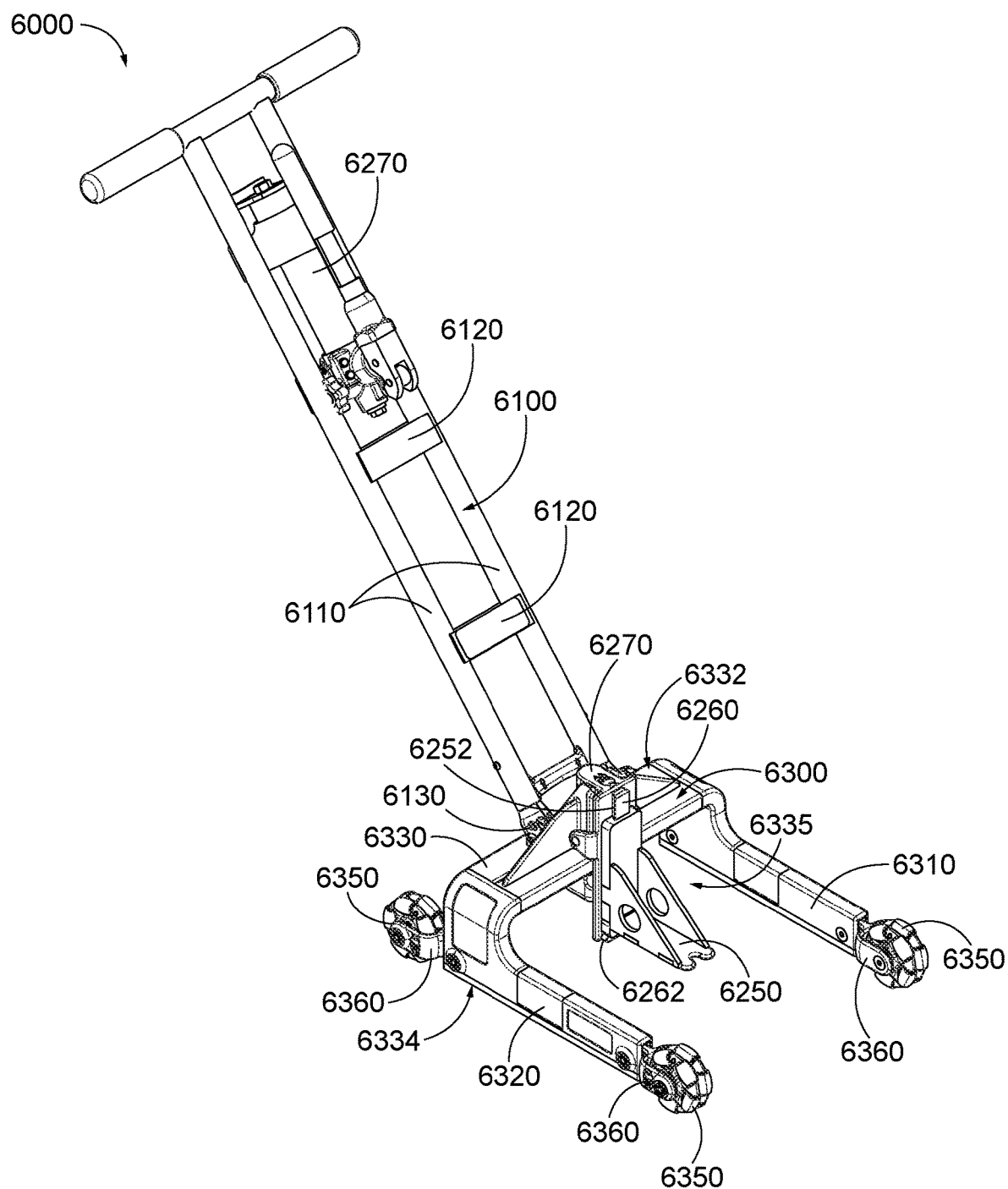
FIG. 19 is a perspective view of a lifting device, in accordance with an example.

The metal frame forming the chassis may further comprise bracing structures 1210 for adding support to the metal frame. Examples of bracing structures are illustrated in FIGS. 9-11. The bracing structures 1210 may be mechanically attached to the metal frame of the chassis 1200. Additionally or alternatively the bracing structures 1210 may be welded directly to the metal frame of the chassis 1200. Additionally or alternatively, multiple metal plates may be stacked to form the chassis 1200. The entire chassis may be strengthened by being formed of multiple metal plates. Additionally or alternatively, multiple metal plates may be stacked at particular locations for providing increased strength. Moreover, the strength of the chassis may be adjusted or increased based on the thickness of the material, the composition of the material, or any combination of these features or of the features described above. In one example, the skate may be symmetrical relative to an axis extending in the longitudinal direction of the seat of the skate. Accordingly, the skate may be symmetrical relative an axis of a longitudinal member extending the length of a longitudinal member. Additionally or alternatively, the skate may be symmetrical relative to an axis that is perpendicular to an axis extending the longitudinal direction of the seat.

With particular reference to each of FIGS. 7-13, the skate 1000 further comprises one or more pull ring receivers 1230. In the example illustrated by FIGS. 8-9 and 12-13 two pull ring receivers 1230 are illustrated. The pull ring receivers 1230 are an extension of the metal frame of the chassis 1200 and are positioned, centrally, at the first end 1002 and the second end 1004 of the skate 1000. The pull ring receiver 1230 is in-line with and extends from the seat 1100 of the skate. A top side 1232 of the pull ring receiver 1230 is at or below the top side, or bearing surface 1110, of the seat 1100. Accordingly, the pull ring receiver remains outside of the pathway formed by the seat 1100 for receiving a longitudinal member and/or supporting the structure of a gondola, in the longitudinal direction of the skate system. Each pull ring receiver 1230 is adapted to receive a pull ring 1500. The pull ring 1500 may be removably connected to, or inserted into, the pull ring receiver 1230. In one example, the pull ring 1500 is connected to the pull ring receiver 1230 by way of a compression fitting wherein the level of compression is adjustable by a set screw to control the degree of movement between the pull ring 1500 and the pull ring receiver 1520. Accordingly, in the examples illustrated by FIGS. 8-13, the pull ring 1500 additionally swivels, or rotates, within the pull ring receiver 1230. The pull ring 1500 comprises a locking end 1510 for locking the pull ring 1500 into the pull ring receiver 1230. The pull ring 1500 additionally comprises a receiving end 1520 for receiving a moving device.

With particular reference to the pull ring 1500 of FIGS. 8-13, the pull ring 1500 swivels, or rotates, within the pull ring receiver 1230. This allows the receiving end 1520 of the pull ring 1500 to swivel into the same direction of travel as the casters 1010, 1020, 1030, and/or 1040 as well as the angle of the moving device. In other words, the pull ring 1500 rotates to move the pull ring into a direction normal to the pull direction. The direction of swivel, or rotation, may be limited to a lateral direction of travel. The ability to swivel the pull ring within a pull ring receiver 1230 also provides an operator the ability to maneuver the pull ring, that may otherwise be centrally positioned on a skate, away from the longitudinal pathway formed by the seat 1100 for receiving a longitudinal member and/or the supporting the structure of a gondola. Thus, by rotating the receiving end 1520 of the pull ring 1500 from the pathway, formed by the seat 1100, the pull ring 1500 does not impede insertion of the longitudinal member or addition of the gondola. In other words, a receiver end 1520 of the pull ring 1500 rotates to opposing sides of the width of the longitudinal member. The receiver end 1520 is clear of a cross-section of the longitudinal member when at the opposing sides of the width of the longitudinal member. Alternatively, it would otherwise be necessary to remove the pull ring 1500 entirely from the pull ring receiver 1230. Additionally, by maintaining the pull ring at or below the seat of the skate a secure connection for moving the gondola moving system is maintained at a lower center of gravity, additionally reducing the risk for tipping or tilting the gondola.

The pull ring 1500 may be connected to the pull ring receiver 1230 by way of a compression fitting. Such a compression fitting may be by way of a bolted connection where the degree of compression controls the movement of and/or locks the pull ring within the pull ring receiver. Thereby, the degree of swivel, or rotation, of the pull ring 1500 may be adjusted or secured by tightening or loosening the bolted connection. This may be accomplished by way of a set screw. Other connections as known in the art are also contemplated herein. Additionally, other compression fittings as known in the art are also contemplated herein. Other means to rotate a pull ring within a pull ring receiver may include a hinge assembly, a ball joint, a pin and aperture, an axle, or the like. Additionally or alternatively, the degree of movement of the pull ring within the pull ring receiver may also be controlled other means including a hinge assembly, a ball joint, a pin and aperture, an axle, or the like.

As illustrated by FIGS. 7-11 the skate 1000 may further comprise one or more anchor assemblies 1240. The anchor assemblies may provide tie down locations for receiving additional components of the skate system 100 and/or for further stabilizing a gondola. In one specific example, which will be discussed in greater detail below in view of FIGS. 35-44, each anchor assembly 1240 is provided to receive a connector bar 4000 for connecting multiple skate systems 100 together to form the gondola moving system 10. In FIGS. 7-11, the anchor assemblies 1240 extend from both a first end 1002 and a second end 1004 of a respective caster frame 1300, 1400. The anchor assemblies may be formed in the chassis 1200 and, more specifically, may be formed in the metal frame of the chassis 1200. Each anchor assembly may receive the over-molded protective coatings just as the chassis 1200 receives the over-molded protective coating. In the examples illustrated here, each anchor assembly 1240 comprises a receiving aperture 1250 for receiving the connector bar. It is contemplated herein that the anchor assemblies 1240 may comprise alternative connecting means as understood by one of ordinary skill in the art.

Moving Device

An example of a moving device 1600 is illustrated by FIGS. 1-6. Here the moving device 1600 is an arm having a first end comprising an attachment mechanism 1610 for securing to the moving device to the pull ring 1500. In the present example, the attachment mechanism 1610 is a hook which is inserted into an aperture 1525 of the receiving end 1520 of the pull ring 1500 and is, thereby, secured to the pull ring 1500 when a force is applied to the moving device 1600 to move the skate system 100. A second end of the moving device 1600 comprises one or more handles for an operator to operate and control the moving device 1600 and, thereby, the skate system 100. The moving device 1600 may be further adjustable. By example, the moving device 1600 may comprise an adjuster 1630 which allows the length $L_{1600}$ of the moving device to be adjusted. The adjuster 1630 may further assist with adjusting the length $L_{1600}$ of the moving device based upon the height of the operator, to accommodate any additional devices being relied on by an operator (e.g. a mechanized moving device), and/or to adjust the angle of attack for providing leverage to the operator for moving the skate system 1600.

Longitudinal Members

Turning now to FIGS. 14-18, a longitudinal member 200 is illustrated. In FIGS. 14-17, the longitudinal member 200 comprises a first longitudinal end 202, a second longitudinal end 204, a top side 206, and a bottom side 208. The longitudinal member 200 is removeably connected to each skate and is separable from each skate. In the examples of FIGS. 14-18, the longitudinal member is a channel. The channel further comprises one or more locking apertures 140 for receiving the locking mechanism of each skate. In lieu of locking apertures, other receiving means, including, but not limited to, recesses, pins, cavities, or the like may be provided for receiving the locking mechanism of the each skate. The channel of FIGS. 14-18 further comprise a web 210, a first flange 220, and a second flange 230. As discussed above, the longitudinal member is positioned within the seat of a skate and further connect multiple skates to form a skate system. In some examples, multiple longitudinal members may be provided through each skate. Some examples may additionally or alternatively have multiple longitudinal members where each longitudinal member connects only two respective skates in a daisy chain configuration. The longitudinal member provides longitudinal support for aligning each skate into a single skate system. In some examples the longitudinal member is non-load bearing and lightweight. In other words, the longitudinal member does not comprise a bearing surface for receiving a gondola. Instead, the longitudinal member is supported by the bearing surface of each skate and may simply be positioned between the bearing surface of the skate and the gondola. In other words, the longitudinal member does not support a vertical load. Thereby, the longitudinal member may be constructed of light-gauge material. In some examples, the longitudinal member is relied on to stabilize the skates in their respective positions and/or to stabilize the skates from tipping when a load is applied to each respective skate.

Lifting Device

Figure 20:
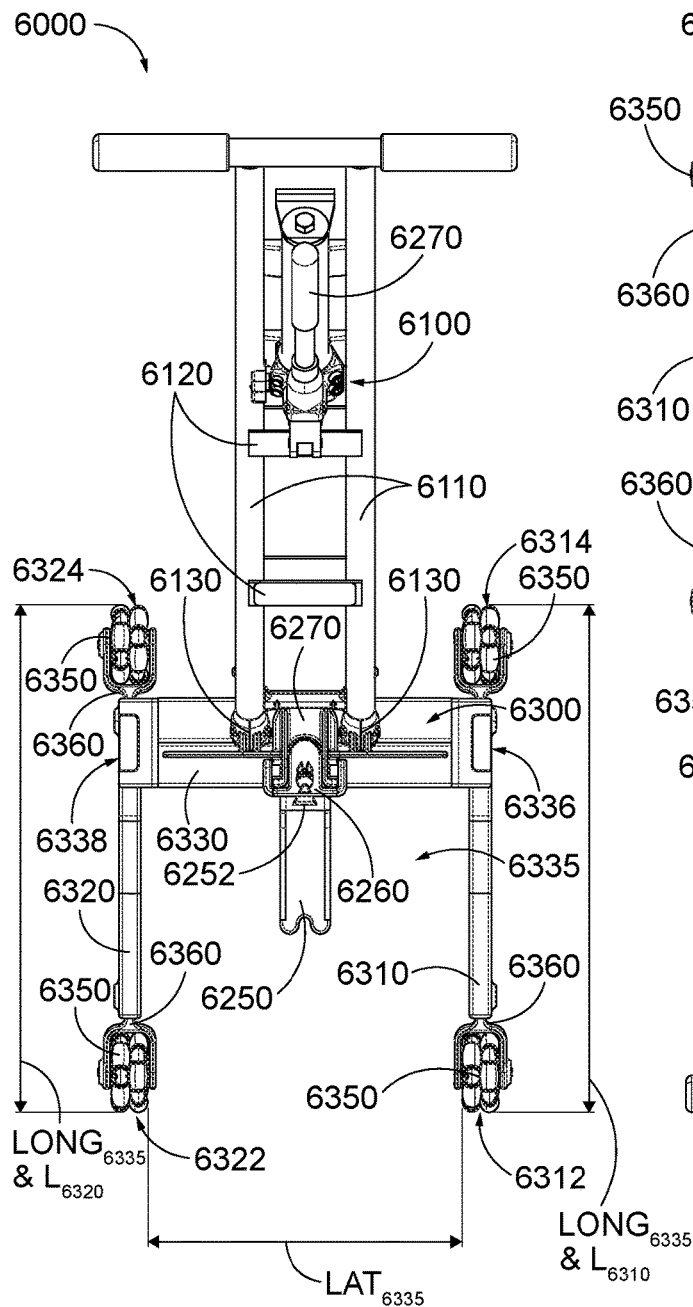
FIG. 20 is a top view of a lifting device, in accordance with an example.
Figure 21:
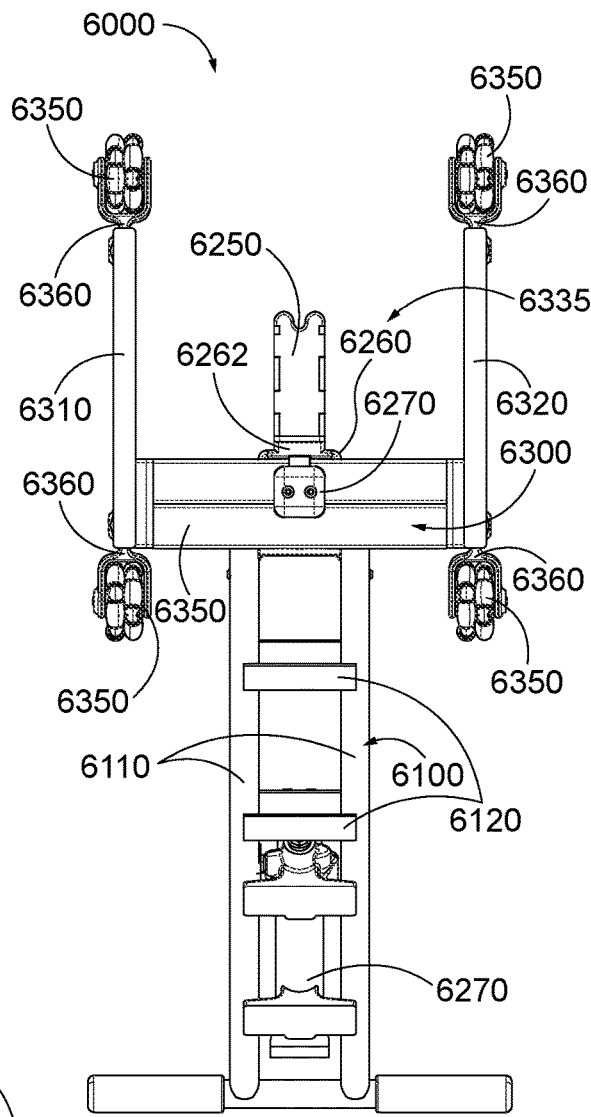
FIG. 21 is a bottom view of a lifting device, in accordance with an example.
Figure 22:
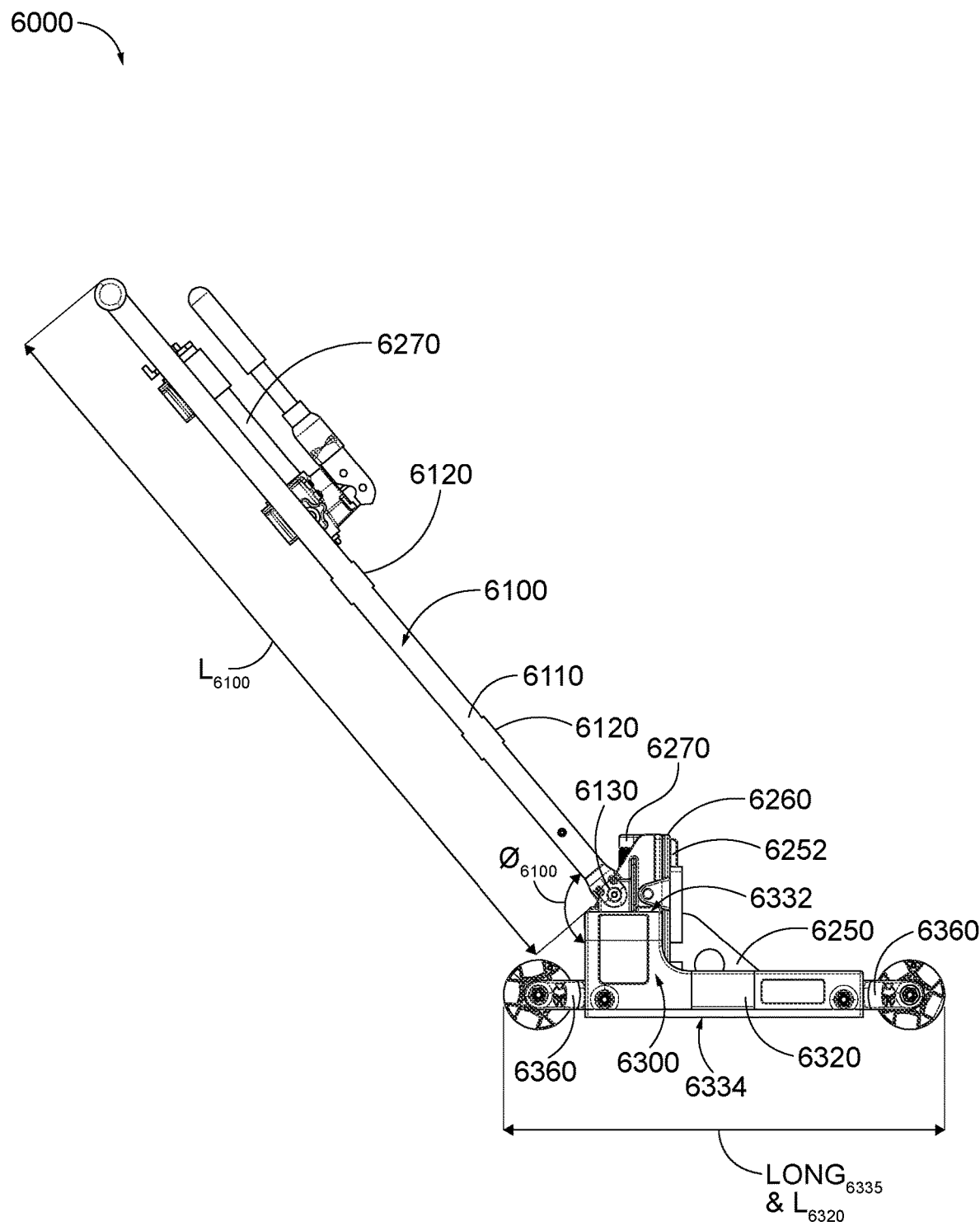
FIG. 22 is a side view of a lifting device, in accordance with an example.
Figure 23:
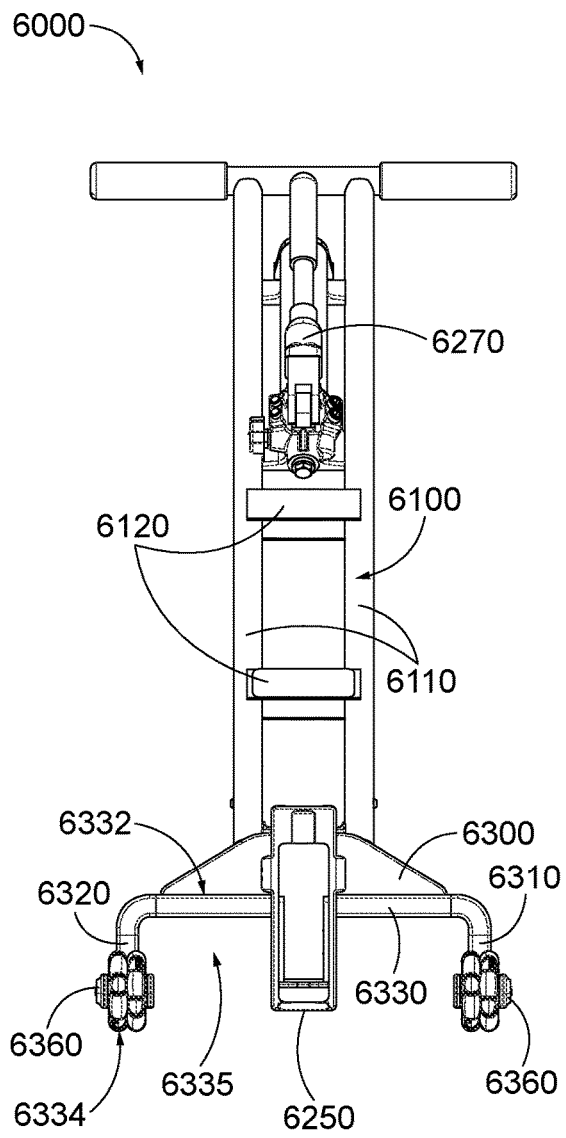
FIG. 23 is an end view of a lifting device, in accordance with an example.
Figure 24:
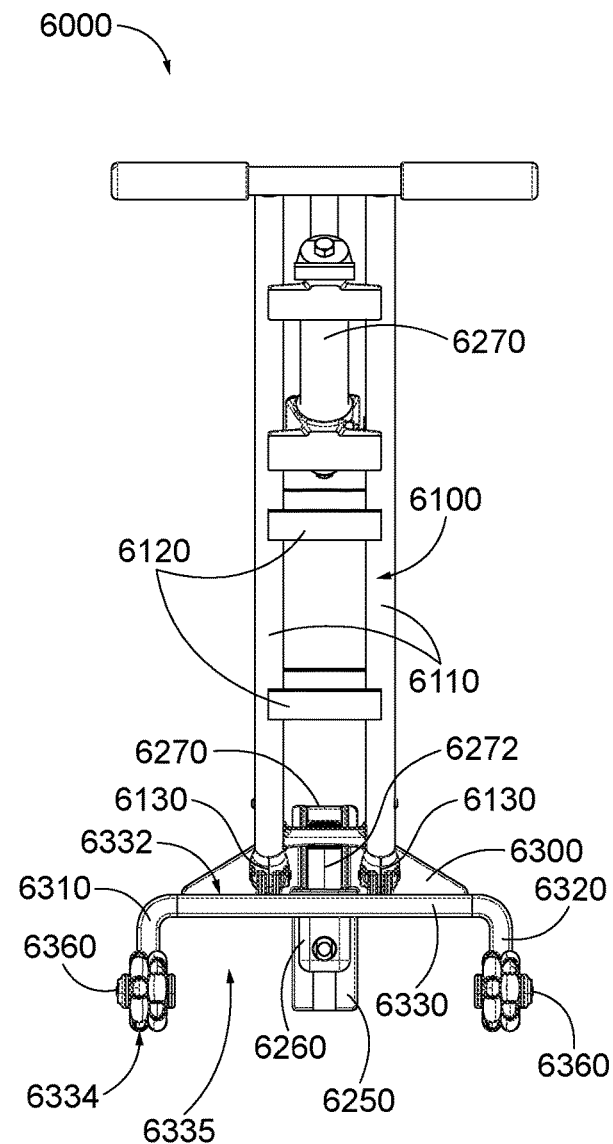
FIG. 24 is an end view of a lifting device, in accordance with an example.
Figure 25:
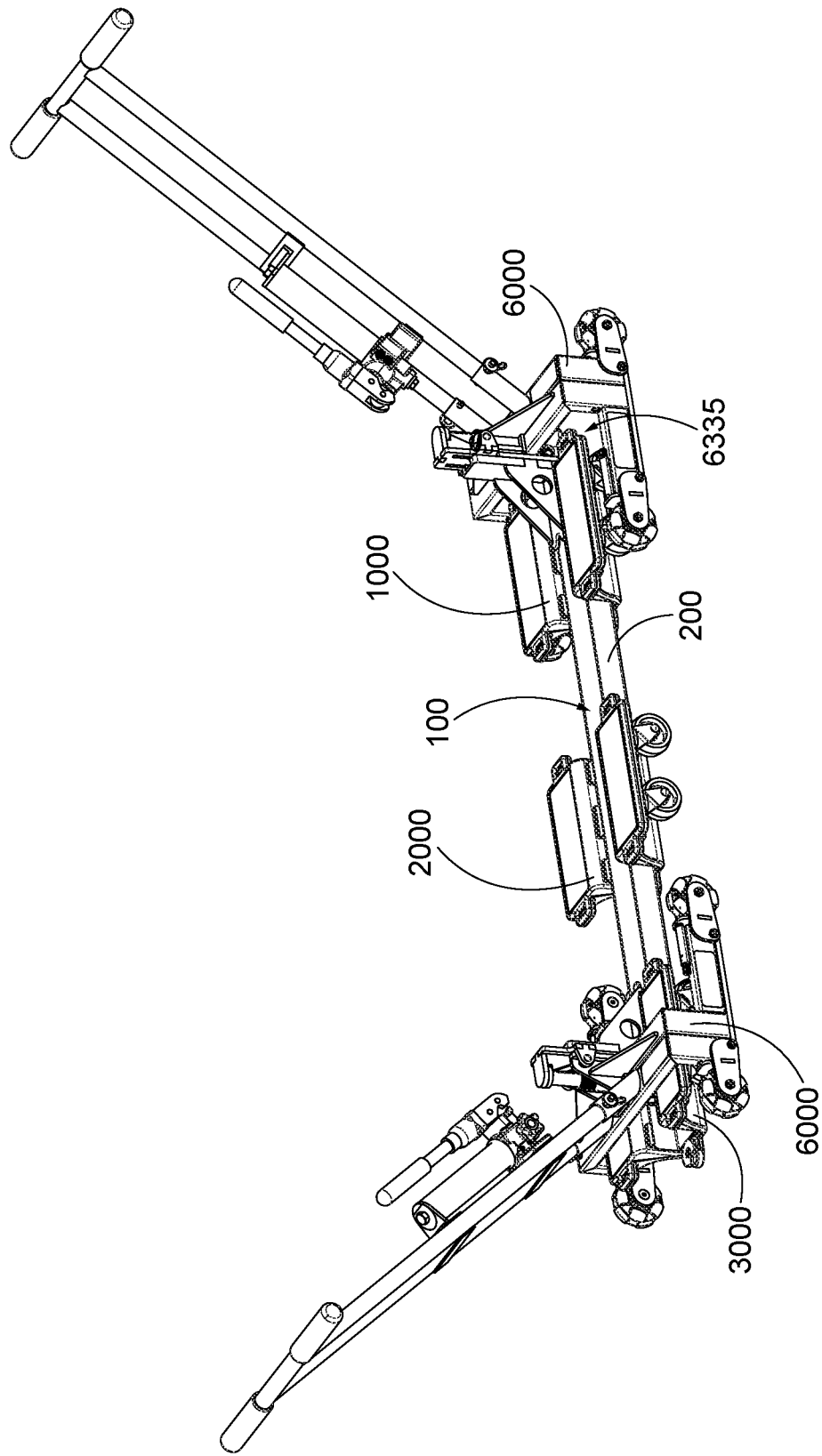
FIG. 25 is a perspective view of a skate system aligned with lifting devices, in accordance with an example.
Figure 26:
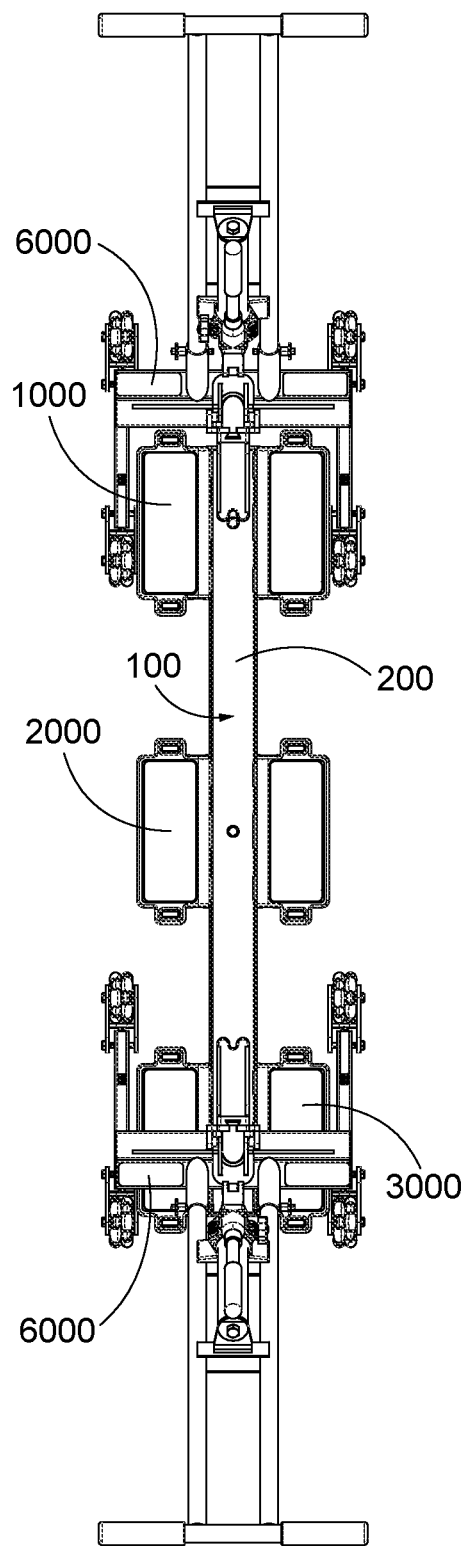
FIG. 26 is a top view of a skate system aligned with lifting devices, in accordance with an example.
Figure 27:
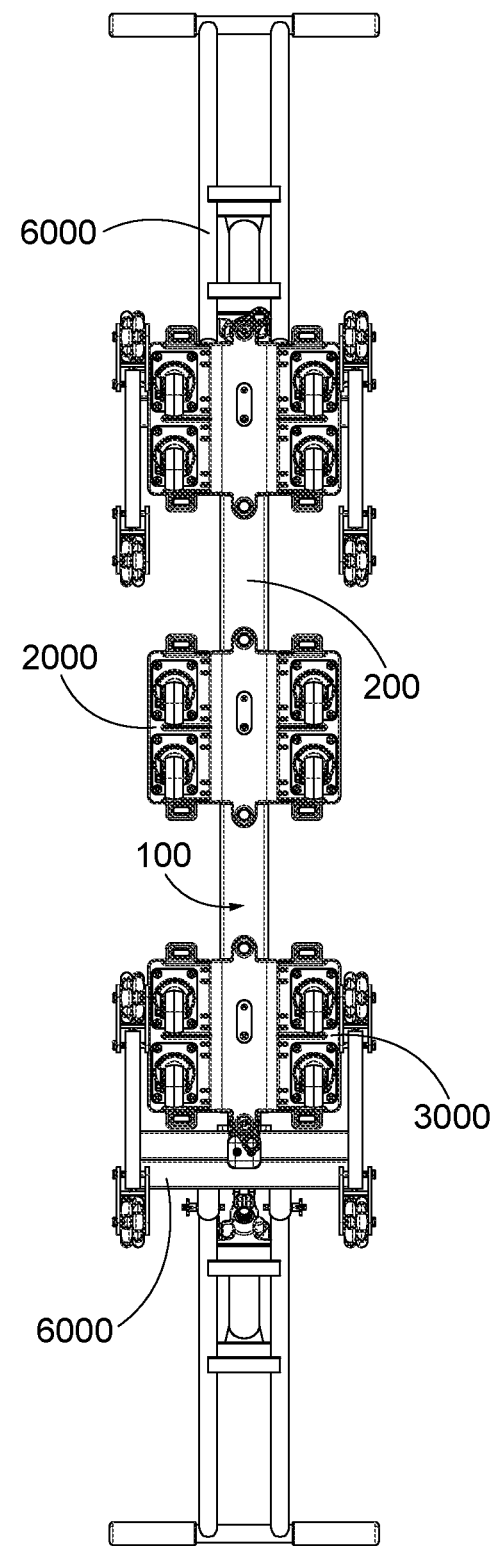
FIG. 27 is a bottom view of a skate system aligned with lifting devices, in accordance with an example.
Figure 28:
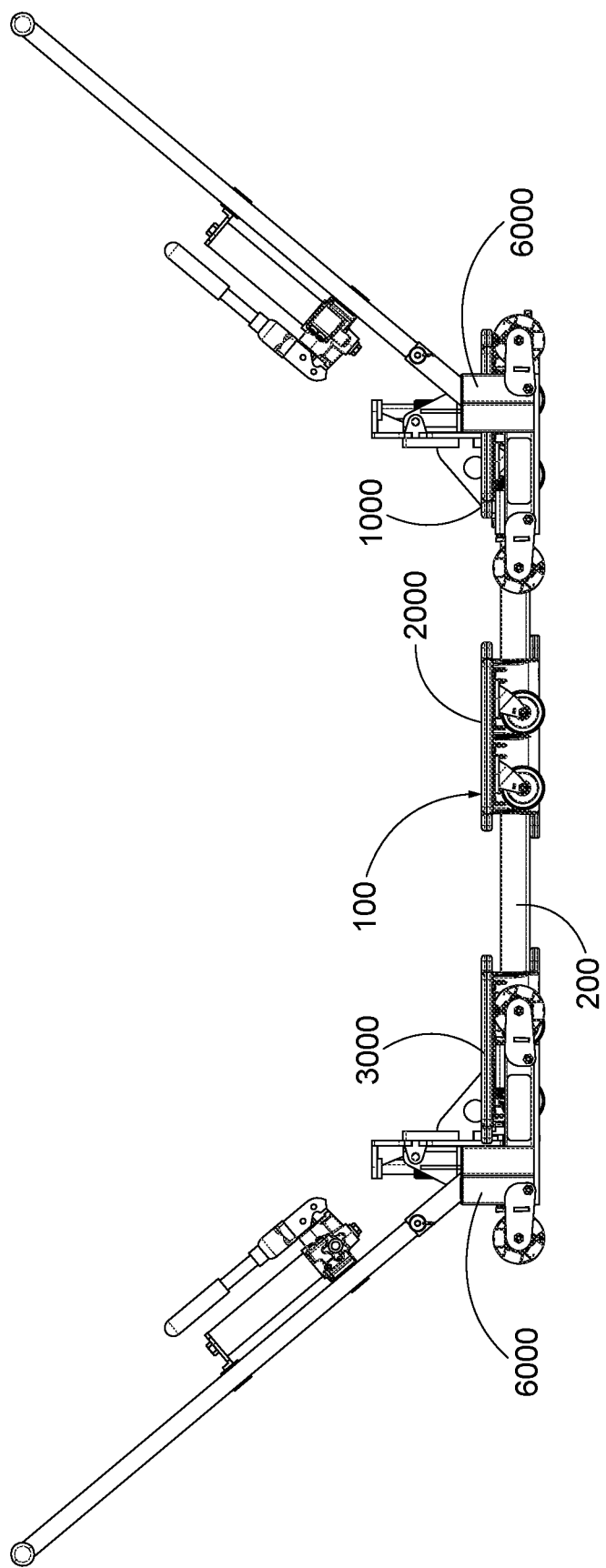
FIG. 28 is a side view of a skate system aligned with lifting devices, in accordance with an example.
Figure 29:
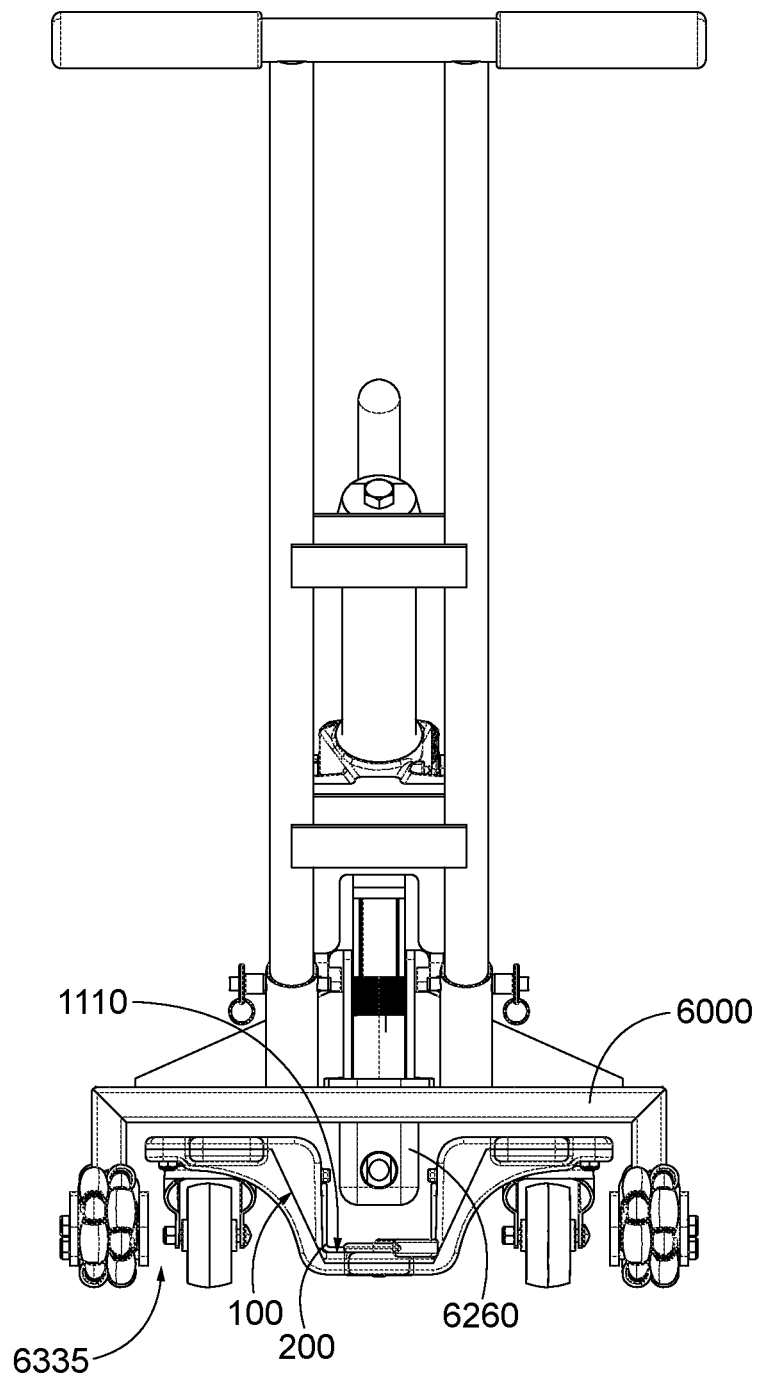
FIG. 29 is an end view of a skate system aligned with lifting devices, in accordance with an example.

Turning now to FIGS. 19-24, a lifting device 6000 is illustrated. The lifting device 6000 of the present disclosure comprises a handle assembly 6100, a lifting assembly 6200, and a base assembly 6300. The handle assembly 6100 extends from the base assembly 6300 and is adjustable relative the base assembly 6300. In particular, the length $L_{6100}$ of the handle assembly 6100 is adjustable and the angle $\theta_{6100}$ of the handle assembly 6100, as illustrated by FIG. 22, is additionally adjustable relative the base assembly 6300. In the example illustrated by FIGS. 19-24, the handle assembly 6100 comprises a plurality of post members 6110 extending the length $L_{6100}$ with bracing members 6120 securing the post members 6110 structurally in a parallel arrangement. It is contemplated that a single post member may also be relied on for the handle assembly. The handle assembly 6100 is pivotably attached to the base assembly 6300. As illustrated by FIG. 20, the handle assembly 6100 may be pivotably attached to the base assembly 6300 by way a hinge assembly 6130. Other pivoting assemblies and/or even a fixed assembly, as known in the art, are contemplated herein. In one example, the handle assembly 6100 may be fully collapsible (e.g. lowered) into a parallel orientation with the support surface, or floor. This facilitates transport of the handle assembly 6100 within a shipping container without increasing the height of the shipping container or compartment. Additionally or alternatively, the handle assembly may be removable from the base assembly 6300.

The lifting assembly 6200 also extends from the base assembly 6300. As illustrated by FIGS. 19-24, the lifting assembly comprises a yoke 6250 removeably attached to a lift face 6260 where the lift face 6260 is operably attached to the base assembly 6300. In these examples, the interface between the yoke 6250 and the lift face 6260 is a dovetail connection 6252 wherein the yoke 6250 is secured to the lift face 6260 by sliding the dovetail arrangement of the yoke 6250 in a mating relationship down the opposing dovetail arrangement of the lift face 6260 from above. The dovetail arrangement of the yoke and the lift face may be provided to limit the movement of the yoke to a vertical direction only. Means for moving the yoke vertically along the length of the dovetail structure may include the interlocking engagement between the dovetail faces between the lift face and the yoke, a bracing structure limiting any non-vertical movement, an encased cylinder limiting any non-vertical movement, or the like. Additionally or alternatively, the means for moving the yoke vertically may be accomplished independent of the dovetail structure, such as, by example a bracing structuring limiting any non-vertical movement, an encased cylinder limiting any non-vertical movement, or the like. The yoke 6250 becomes seated onto the lift face 6260 upon being lowered onto a bottom plate 6262 of the lift face 6260. The bottom plate 6262 is additionally adjustable by providing inserts between the bottom plate 6262 and the bottom of the yoke 6250 to change the elevation of the bottom plate 6262 relative the lift face 6260 and, thereby, changing the elevation of the yoke 6250. By adjusting the elevation of the yoke 6250, a mating arrangement between the yoke assembly and a gondola, and more specifically to account for leveling feet of a gondola, is provided, as will be addressed in greater detail below. Additionally, a removable yoke is provided to facilitate a variety of interchangeable yoke configurations. This allows for a lift assembly to be used and adapted across multiple types of gondolas and/or in combination with various types of leveling feet.

In the examples of FIGS. 19-24, the lift face 6260 is operably attached to the base assembly 6300 such that the lift face 6260 moves in a vertical direction, relative the base assembly 6300. The vertical movement of the lift face 6260 is operated by a lifting mechanism 6270. In the present examples, the lifting mechanism 6270 is secured to the handle assembly 6100 and is a hydraulic assembly for operating a hydraulic ram 6272 which moves the lift face 6260, relative the base assembly 6300. By having the hydraulic ram 6272 interface and/or fixed between the lift face 6260 and the base assembly 6300 any non-axial load on the hydraulic ram 6272 is eliminated in comparison to positioning the hydraulic ram directly between the lifting device and the gondola. This reduces the possibility for failure of the hydraulic ram due to forces resulting from non-axial loads. Non-axial loads may additionally or alternatively be eliminated in examples where the lift mechanism raises the lift face in a vertical direction only. Such a non-axial load may be eliminated or prevented by way of the dovetail structure and/or the corresponding means previously described. In one specific example, the hydraulic assembly is rated to lift 10,000 pounds. The lifting mechanism 6270 is additionally secured to and between two post members 6110 of the handle assembly 6100. The hydraulic connections and/or the control mechanisms between the lifting mechanism 6270 and the hydraulic ram at the lift face 6260 may be concealed within one or more post members 6110. Alternatively, the hydraulic connections and/or the control mechanisms may be directly connected to the lift face 6260. The lifting mechanism 6270 operates the hydraulic ram 6272 positioned between the lift face 6260 and the base assembly 6300 thereby raising and lowering the lift face 6260 relative the base assembly. In the examples of FIGS. 19-24, the lift face operates the yoke for raising and lowering a support of a gondola. In specific examples, the lifting mechanism 6270 moves the lift face 6260 in a vertical direction only.

In some examples, the lift mechanism 6270 is configured to move the lift face 6260 at set distances and to additionally lock-out or secure the lift face in each respective position, regardless of whether the lift mechanism 6270 is being operated or the hydraulic ram remains in operation. In particular, the controller of the lift mechanism 6270, such as a lever pump of a hydraulic system, may move a set distance (e.g. per singular lever pump). This is referred to herein as repeatability. Other examples may include mechanical progression presets by way of the lift mechanism. Moreover, to lock-out or secure the lift face in position, the lift mechanism may maintain the hydraulic ram in compression to maintain its position. Additionally or alternatively, other mechanical lock-out mechanisms may be relied upon to secure, or lock-out, the lift face in each respective position as the lift mechanism moves the lift face. An example of a lock-out mechanism may be a ratchet assembly which may be used independently of or in combination with a hydraulic system. Additional mechanisms relied on to lock-out the position of a lift mechanism are contemplated herein. By moving the lift face a set distance and/or providing lock-out capabilities, one lift mechanism, or lifting device, may be calibrated with and used in unison with additional lift mechanisms, or lifting devices. This is referred to herein as consistency. This will allow a loaded gondola to be lifted from multiple locations in consistent fashion. In other words, multiple lifting devices may be used in unison, or in parallel, and is referred to herein as parallelism. Additionally, this may allow for a single operator to operate multiple lift mechanisms, or lifting devices without remaining at the controls of each mechanism or device.

Turning now to the base assembly 6300 of the lifting device 6000 of FIGS. 19-24, the base assembly 6300 supports the handle assembly 6100 and the lift assembly 6200 of the lifting device 6000. The base assembly 6300 comprises two opposing bases that are a first base 6310 and a second base 6320 where the lift face 6260 is positioned there between. In the example of FIGS. 19-24, the first base 6310 and the second base 6320 are horizontal arms that are further parallel with one another. Each base 6310, 6320 comprise at least two base wheels 6350. In some examples, the base wheels 6350 are each multi-directional wheels. Examples of multi-directional wheels include omni-directional wheels as described in U.S. Pat. No. 9,248,698, issued on Feb. 2, 2016 and U.S. Pat. No. 9,327,954, issued on May 3, 2016, both of which are herein incorporated by reference. The omni-directional wheels provide for the lifting device to glide across the floor in any direction without having to reset the direction of lifting device. More generally, multi-directional wheels are wheels with the ability to change direction and/or travel in multiple directions.

The first base 6310 and the second base 6320 are connected to one another by a cross member 6330. The cross member 6330 is elevated above the ground surface to form a void 6335 between the first base 6310 and the second base 6320. The void 6335 is additionally below the cross member 6330. The lift face 6260 forms a part of, or is attached to, the cross member 6330. In the examples of FIGS. 19-24, the lift face 6260, and thereby the yoke 6250, is centrally positioned on the cross member 6330, between the first base 6310 and the second base 6320 and lowered into and raised from within the void 6335. The hydraulic ram 6272 may additionally be secured to the cross member 6330 of the base assembly 6300. In the illustrated examples, the hydraulic ram 6272 is secured to a base assembly top side 6332 which is opposite a base assembly bottom side 6334 framing the void 6335. The handle assembly 6100 is additionally attached to the top side 6332 of the cross member 6330 of the example of FIGS. 19-24. Each of the first base 6310 and the second base 6320 may also be extendable their respective lengths $L_{6310}$, $L_{6320}$. Each first base 6310 and the second base 6320 may extend from each respective end 6312, 6314 and 6322, 6324 and may, therefore, adjust the longitudinal dimensions $LONG_{6335}$ of the void 6335. Further, the cross member 6330 may additionally extend such that each of the first base 6310 and the second base 6320 may extend from opposing ends 6336, 6338 of the cross member 6330 and may, therefore, adjust the lateral dimensions $LAT_{6335}$ of the void 6335.

The first base 6310 and the second base 6320 also comprise a suspension system 6360. The suspension system 6360 operates such that when a load, or weight, is applied to the base assembly 6300, the base assembly 6300 lowers to rest on the support surface, or floor. Upon resting on the floor, the lifting device 6000 becomes immobilized while the load, or weight, is applied. The load, or weight is applied by positioning the yoke 6250 on a component that requires lifting. As used herein, a gondola will be relied on, generally, to refer to a component that requires lifting. It is, however, appreciated that the lifting mechanism may be used for other components requiring lifting. In one example, the yoke 6250 is configured to engage and receive a base plate of a gondola. The yoke 6250 is then raised by way of the lift face 6260 and the lift assembly 6200. As the yoke 6250 is raised the load, or weight, begins to bear on the yoke 6250 and is applied to the lifting device 6000 through the yoke 6250. The load, or weight, overcomes the resistive force of the suspension system 6360 until the suspension system lowers the base assembly 6300 until the first base 6310 and the second base 6320 of the base assembly 6300 are resting on the support surface, or floor. The first base 6310 and the second base 6320 may further comprise a composite material, such as rubber, to the underside to prevent damage to the support surface, or floor, when fully resting on the floor and supporting the weight of the gondola. Once the base assembly 6300 is resting on the floor, the lift assembly 6200 may continue to raise the gondola, by way of the yoke 6250 and the lift face 6260 until the gondola has been raised to the desired elevation, as will be discussed in greater detail below. The gondola may be lowered in opposite fashion wherein the lift assembly 6200 lowers the gondola to the ground upon and until the load, or weight, of the gondola is again resting on the support surface, or floor, and/or on a skate system. As the lift assembly 6200 lowers the gondola to the floor or skate system, the resistive forces of the suspension system raise the first base 6310 and the second base 6320 from the support surface, or floor up and until the lifting device 6000 once again becomes operable on the base wheels 6350 and is again maneuverable on the support surface, or floor. The lifting device 6000 may, thereafter, be removed from the gondola.

One example of a means for a suspension system 6360 to lower a base assembly 6300 as a load is applied includes base wheel axles which are pivotably connected to the respective ends of each of the first base 6310 and the second base 6320. The base wheel axles extend from each of the respective ends and pivot on each of the first base 6310 and the second base 6320. A spring-loaded mechanism may be provided at each pivot device such that each spring-loaded mechanism resists the weight of the lifting device, collectively, and thereby does not pivot under the weight of the lifting device, but begins to pivot upon the addition of weight, above and beyond the weight of the lifting device, such as under the weight of a gondola. Once the additional weight is removed from the lifting device the spring mechanism then pivots again, in the opposite direction, to raise the first base 6310 and the second base 6320 from the support surface, or floor. The resistance of the spring mechanism may be adjustable in order to compensate for varying weights of different gondolas. Other means for a suspension system to lower the base assembly 6300 are additionally contemplated herein. Examples may include, but are not limited to, in-line springs, coil springs, hydraulic springs, shock absorbers, one or more linkages, slip fittings, or any combination thereof.

The void 6335 is provided at the base assembly 6300 of the lifting device 6000 in order to approach and straddle the gondola, or a support of the gondola. More specifically, the first base 6310 and the second base 6320 extend beyond the load point, to the underside of a gondola, and assist with keeping the load stable. By example, the lifting device 6000 may be operated upon the base wheels to where a support member of a gondola is inserted into the void 6335 between the first base 6310 and the second base 6320. The support member of the gondola may also be positioned within the void 6335 such that it is below the cross member 6330 of the lifting device 6000 in order to engage the yoke 6250 and be supported and/or raised by the yoke 6250 by way of the lift device 6000. As a result of the ability to straddle the gondola, that is positioning the gondola (or a portion thereof) between the first base 6310 and the second base 6320, all the weight of the gondola is distributed across the lifting device in a balanced fashion. This eliminates the risk of becoming dislodged from the lifting device or creating an unbalanced load. Further, this allows for the lifting device to lock-out or secure the lift face during operation and maintain the gondola suspended during operation. This is in contrast to a lever or pry system which may otherwise spring in the opposing direction under the load of the gondola upon release of the lever or pry system. The danger of a lever or pry system is only amplified by having the fulcrum of the lever or pry system so low to the ground, such as is required to raise a gondola from its base. Moreover, an operator must always maintain control of the lever or pry system otherwise the gondola would be dropped, risking damage and injury to the operator, gondola, and/or product on the gondola.

Lifting Device+Skate System

Turning now to FIGS. 25-29, a lifting device 6000 is used in combination with a skate system 100. In the example of FIGS. 25-29, two lifting devices 6000 are illustrated to opposing ends of a skate system 100. The skate system comprises a first skate 1000, a second skate 2000, and a third skate 3000. A longitudinal member 200 connects the first skate 1000 and the second skate 2000 with the third skate 3000 there between. The first skate 1000, the second skate 2000, and the third skate 3000 are evenly spaced the length of the longitudinal member $L_{200}$ with the first skate 1000 at the first longitudinal end 202 of the longitudinal member 200 and the second skate 1000 at the second longitudinal end 204 of the longitudinal member 200 (longitudinal ends 202, 204 as illustrated in FIGS. 1-3). The lifting devices 6000 are positioned at each end of the skate system 100 but are independent of the skate system 100. In particular, as illustrated by the end view of FIG. 29, the skate system 100 is inserted through the void 6335 of the lifting device. Using the first skate as an exemplary example (where the first skate 1000 is being relied on as an exemplary example of each the first skate 1000, the second skate 2000, and the third skate 3000), the low profile arrangement of the bearing surface 1110 of the first skate 1000 allows the yoke and lift face 6260 of the lifting device 6000 to pass through the first skate 1000 and the longitudinal member 200 without impeding the advancement of the skate system 100. The lifting devices 6000 are relied on to lift a gondola so the skate system 100 may be inserted in through the void 6335 of a lifting device 6000, when the lifting device has elevated the gondola from a support surface, or floor. The lifting device may then lower the gondola to where the gondola is supported upon the bearing surface 1110 of the skate 1000. The vertical point loads of the gondola may be supported upon the bearing surface 1110 of each skate 1000 (where the first skate 1000 is being relied on as an exemplary example of each the first skate 1000, the second skate 2000, and the third skate 3000) by being placed on the longitudinal member which is positioned upon and additionally supported by the bearing surface 1110.

The lifting device 6000, as well as each skate 1000, 2000, and 3000 of the skate system 100, may be constructed such that they comprise obliquely angled and/or radiused corners and/or edges. In particular, the lifting device 6000 may comprise obliquely angled and/or radiused corners and/or edges so to guide the skate system 100 in through the void 6335. Likewise, the perimeter of each skate 1000, 2000, and 3000 may additionally comprise obliquely angled and/or radiused corners and/or edges to additionally guide the skate system 100 in through the void 6335. The obliquely angled and/or radiused corners and/or edges allow each system to adjust and pass by the adjacent component (e.g. each skate 1000, 2000, and 3000 in through the void 6335) without becoming hung up on the gondola, other components and/or any other obstacles. Additionally, the obliquely angled and/or radiused corners and/or edges may guide each system past the adjacent component or such obstacles.

Further, the lifting device 6000 may further comprise an alignment system. The alignment system engages a skate 1000 and directs the skate into proper approach for entering the void. An example of an alignment system includes one or more walls which funnel the skate 1000 into the void 6335 of the lifting device 6000. In other examples, the alignment system may be a part of the skate 1000 in addition to or as an alternative to an alignment system of the lifting device. In some examples, an alignment system may be provided at the lifting device to assist with aligning a skate system in through the void of the lifting device. The alignment system of the lifting device may extend directly from the yoke and guide skate system by way of the longitudinal member (e.g. such as along the inside of a channel, the perimeter of a longitudinal member, a guide structure (such as a groove) within the longitudinal member, or the like). Additionally or alternatively, an alignment system may extend from the skate system. This may assist with aligning the skate system once the skate system clears the lifting device and/or any alignment system of the lifting device relative the gondola and/or adjacent skate systems.

Figure 30:
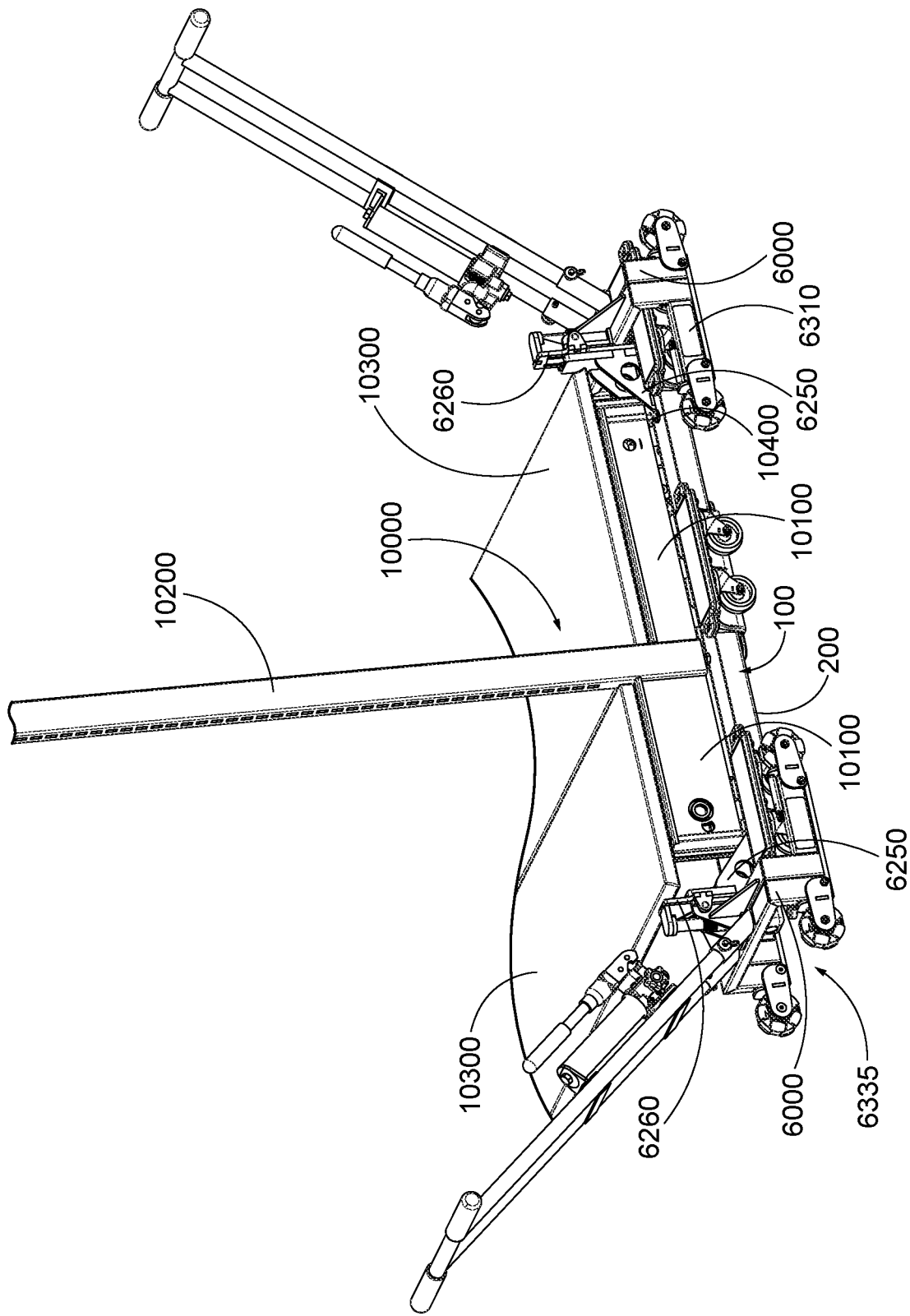
FIG. 30 is a perspective view of a skate system, lifting devices, and a partial gondola structure, in accordance with an example.
Figure 31:
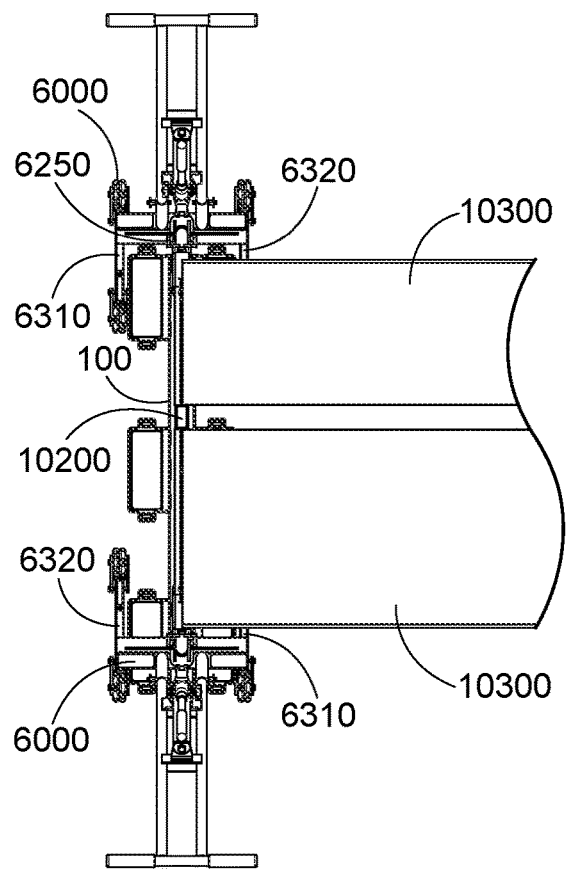
FIG. 31 is a top view of a skate system, lifting devices, and a partial gondola structure, in accordance with an example.
Figure 32:
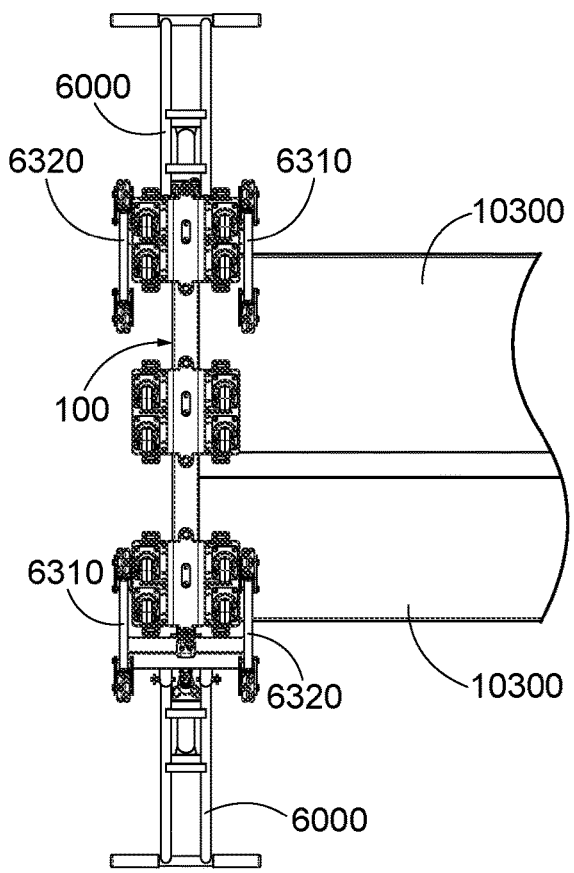
FIG. 32 is a bottom view of a skate system, lifting devices, and a partial gondola structure, in accordance with an example.
Figure 33:
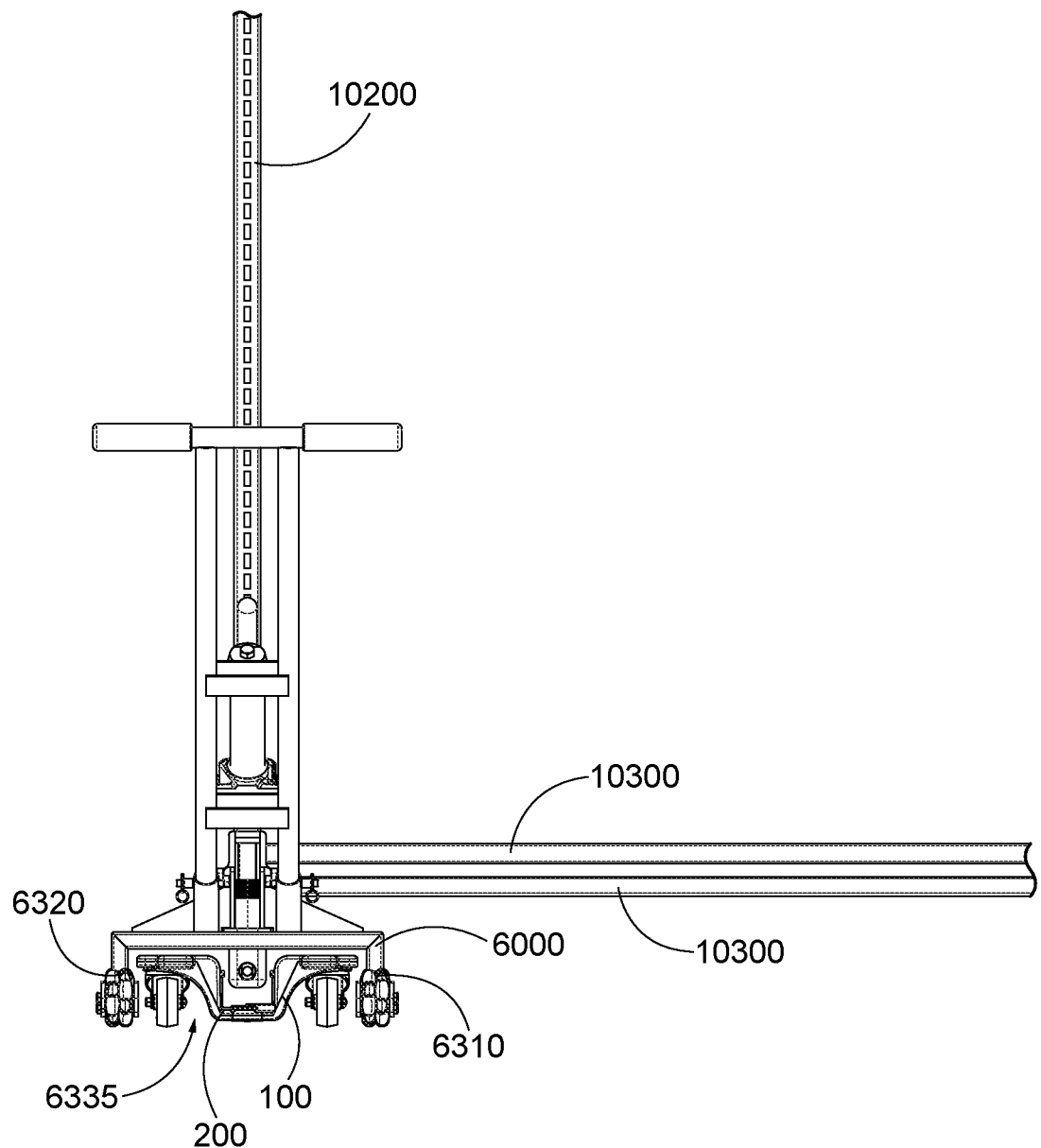
FIG. 33 is an end view of a skate system, lifting devices, and a partial gondola structure, in accordance with an example.
Figure 34:
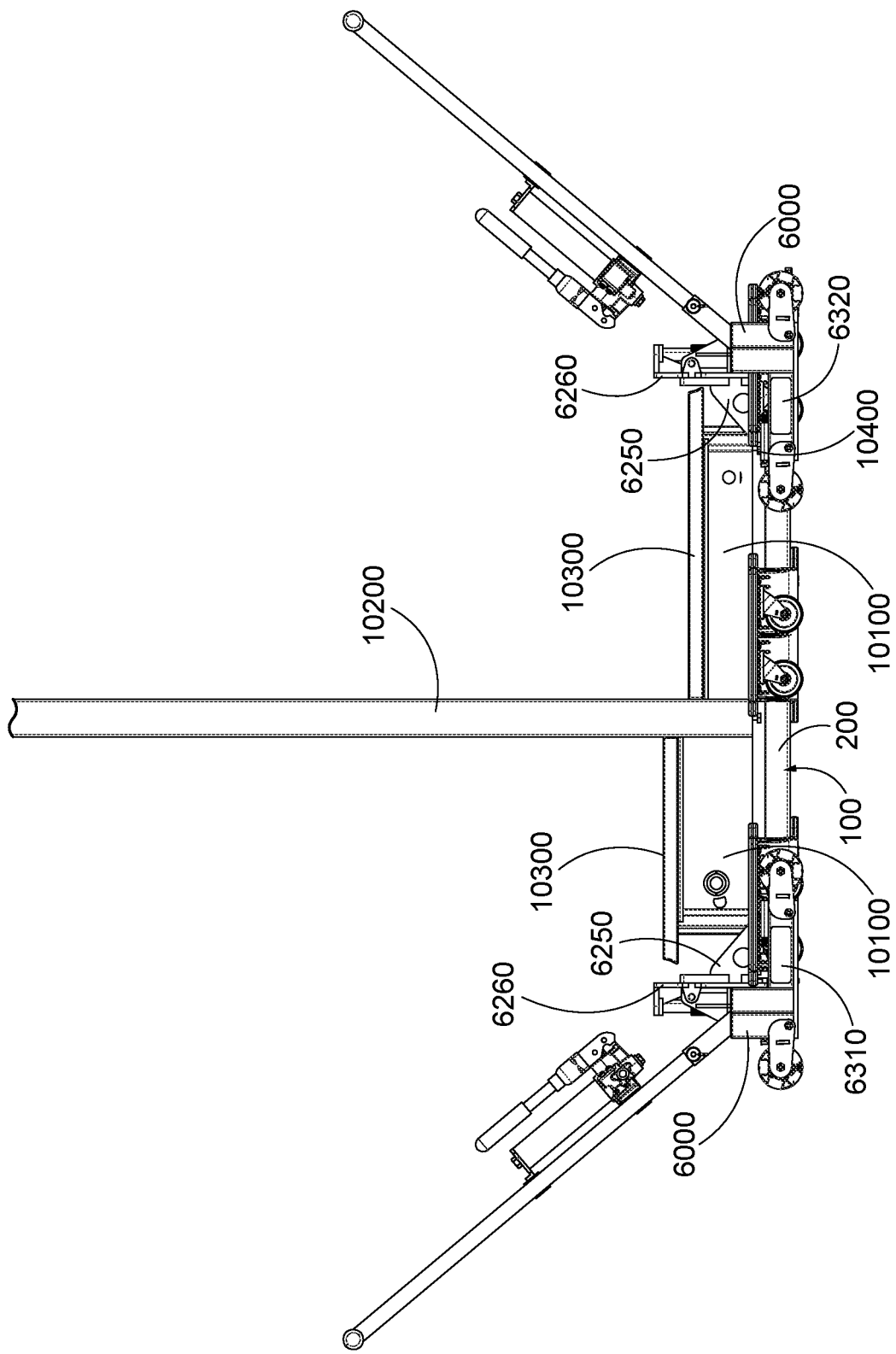
FIG. 34 is a side view of a skate system, lifting devices, and a partial gondola structure, in accordance with an example.
Figure 35:
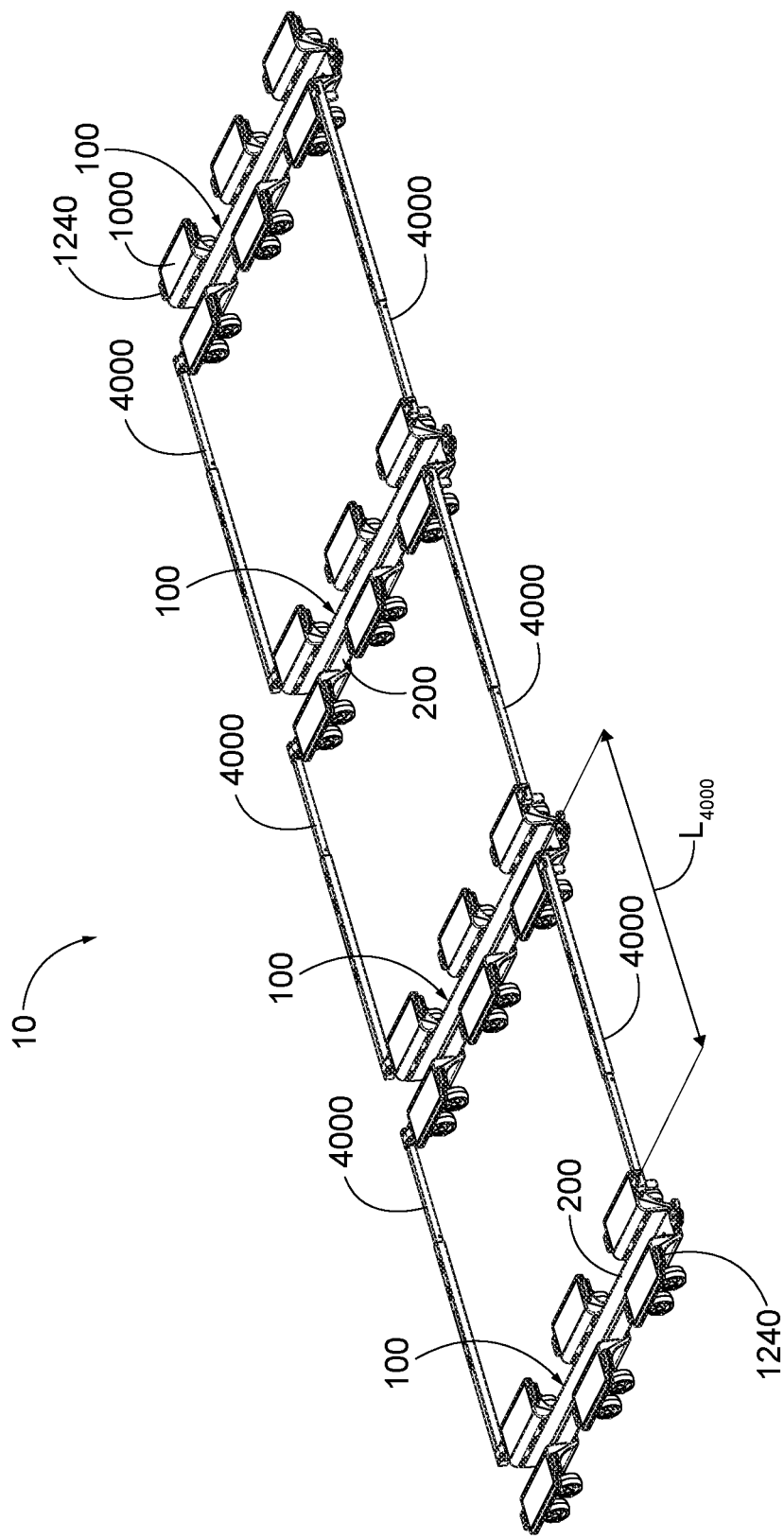
FIG. 35 is a perspective view of a gondola moving system, in accordance with an example.
Figure 36:
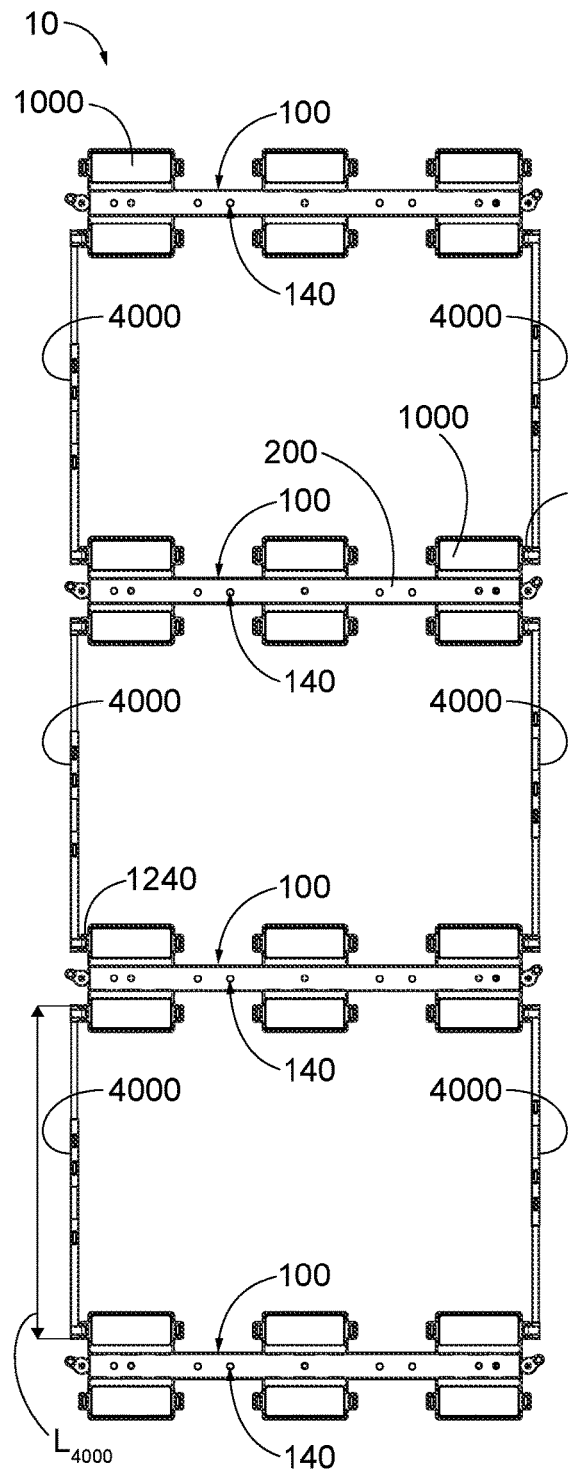
FIG. 36 is a top view of a gondola moving system, in accordance with an example.
Figure 37:
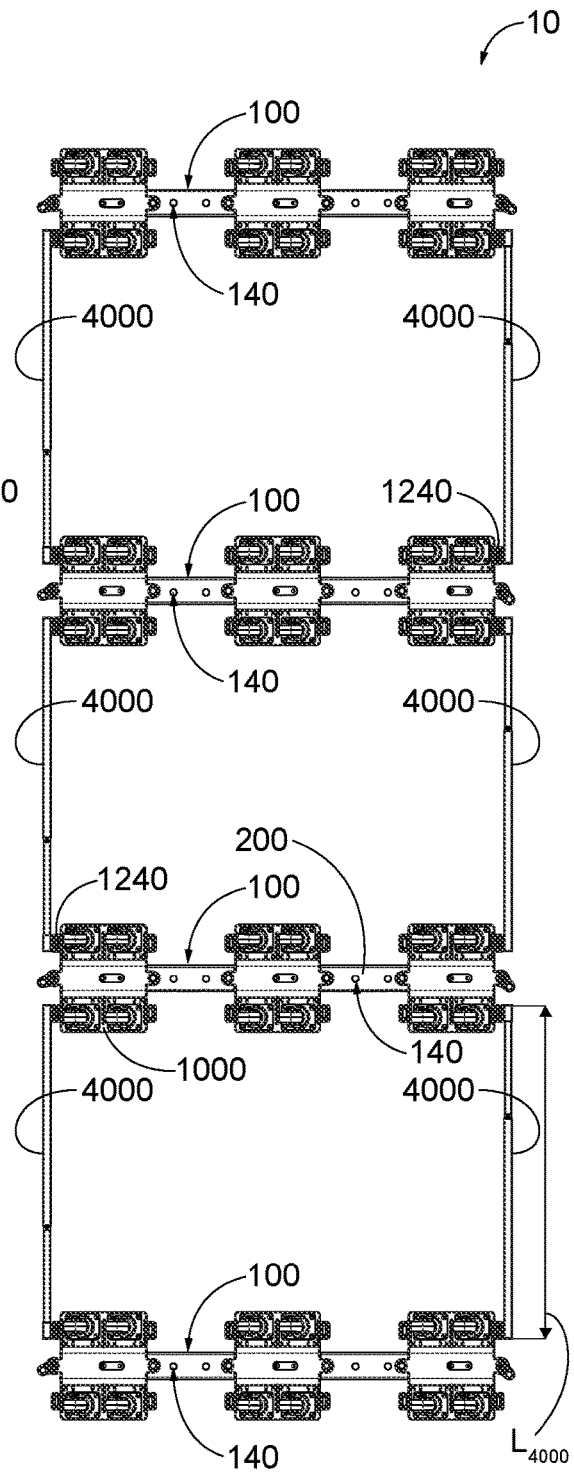
FIG. 37 is a bottom view of a gondola moving system, in accordance with an example.
Figure 38:
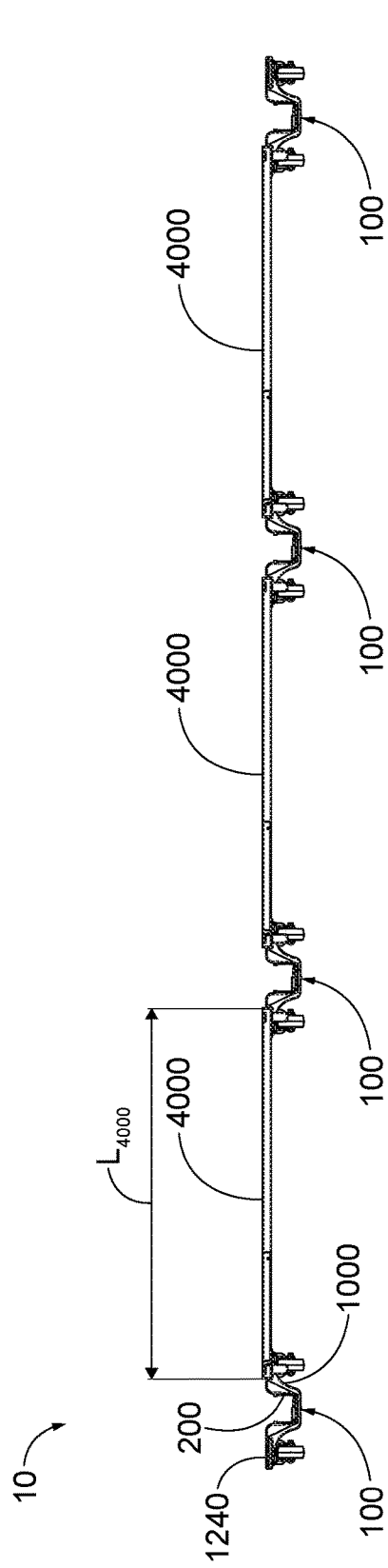
FIG. 38 is an end view of a gondola moving system, in accordance with an example.
Figure 39:
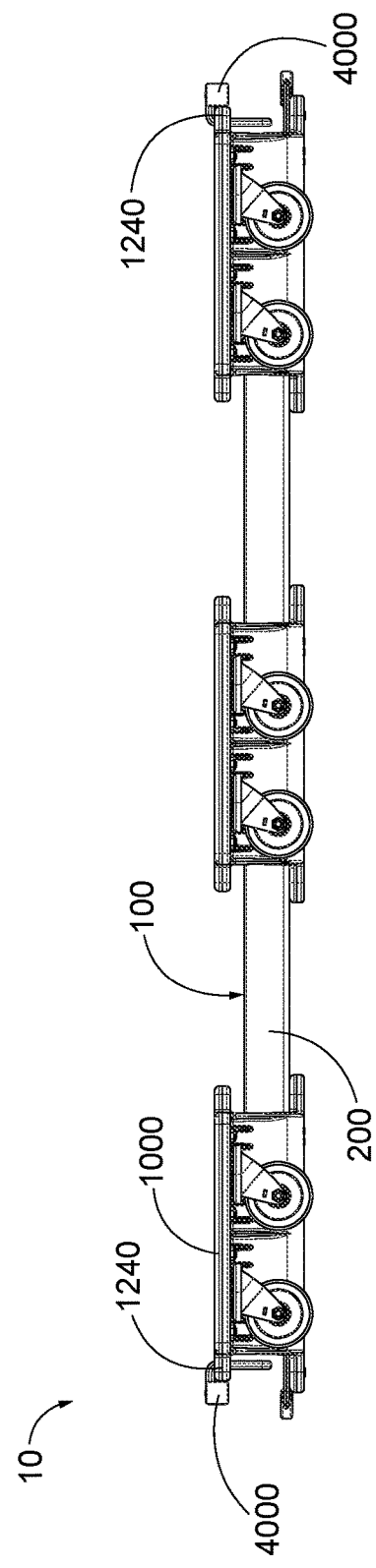
FIG. 39 is a side view of a gondola moving system, in accordance with an example.

Turning now to FIGS. 30-34, the lifting devices 6000 and the skate system 100 of FIGS. 25-29 are further illustrated to include a section of a gondola 10000. In these examples, the gondola 10000 comprised of base brackets 10100, an upright 10200, and shelves 10300. For illustrative purposes, the gondola 10000 is illustrated in a partial view. As illustrated by FIG. 30, the yoke 6250 of the lifting device 6000 is inserted below the base bracket 10100 and mates with a leveling foot 10400 extending from the base bracket 10100. The leveling foot 10400 is positioned between first base 6310 and the second base 6320 of the base assembly 6300 when the yoke mates with the gondola. The yoke 6250 may then be lifted by the lift face 6260 thereby raising the gondola 10000 at that respective location. The yoke 6250, the lift face 6260 and the gondola 10000 are raised within the void 6335 and/or to above the void 6335 so that the skate system 100 may pass through the void 6335. The yoke 6250 and/or the lift face 6260 of the lifting device 6000 may move in a vertical direction only.

Still referring to FIGS. 30-34, a second lifting device 6000 is located at yet another base bracket 10100 with the yoke 6250 of the lifting device 6000 inserted below the base bracket 10100 and mating with yet another leveling foot 10400 of the gondola 10000. The second lifting device 6000 may lift a respective yoke 6250 thereby raising the gondola 10000 at a respective location. As described above, when multiple lifting devices 6000 are provided they may lift the gondola in unison such that the gondola is lifted to achieve safety, repeatability, consistency, and parallelism with one another so not to upset the gondola and/or materials on the gondola. Once the lifting devices 6000 raise the gondola, including the bottom of the yoke 6250, to a requisite height (e.g. to above the height of bearing surface 1110 and/or the longitudinal member 200) the skate system 100 may then be inserted in through a void 6335 of the lifting device 6000 until it is under the base brackets 10100 or feet of the gondola 10000. The lifting device 6000 the lowers the gondola onto the skate system 100 such that the gondola is supported by the bearing surface 1110 of each skate 1000 (with the first skate 1000 being representative of the structure for the second skate 2000 and the third skate 3000). As indicated above, the skate system 100 may be modifiable such that additional skates may be added to or removed from the length of the longitudinal member to accommodate additional base brackets 10100 or feet of the gondola 10000. In the example of FIGS. 30-34, a skate is positioned to each end of the base bracket 10100 of the gondola as well as having a skate positioned at an intermediate upright 10200. In some examples, a skate will be positioned at each foot of the gondola thereby providing consistent support to the gondola across the skate system in the same manner as having the gondola positioned directly upon the support surface, or floor. Upon being placed upon the skate system the gondola is now mobile.

Gondola Moving System

Turning now to FIGS. 35-39, multiple skate systems 100 are illustrated where the multiple skate systems 100 are connected to one another by way of connector bars 4000 to form a gondola moving system 10. In the example of FIGS. 35-39 four skate systems 100 are in parallel arrangement with one another with a connector bar 4000 extending between adjacent end skates of an adjacent skate system 100. A connector bar 4000 additionally extends between the opposing end skates of each skate system 100. The connector bars 4000 are attached to each respective skate system 100 by way of the one or more anchor assemblies 1240. A detailed view of the anchor assembly 1240 is illustrated in FIGS. 43-46.

As illustrated by FIGS. 43-46, the anchor assembly 1240 comprises a receiving aperture 1250 formed in or extending from the metal frame of the chassis 1200 of a skate 1000. The connector bar 4000 may comprise an insert hook 4100 for dropping into the receiving aperture 1250 by way of gravity. In other words, the insert hook 4100 may be inserted into the respective receiving aperture 1250 from above the respective skate using a toolless connection. The insert hook 4100 may be offset from an axial length of the connector bar 4000. In one example, a first insert hook 4100 of a connector bar may be inserted into a receiving aperture 1250 of one skate of a first skate system and a second insert hook 4100 may of the connector bar may be inserted into a receiving aperture of one skate of a second skate system. Although an insert hook 4100 and a receiving aperture 1250 are illustrated in the present example, additional mechanical means known in the art for forming a connection between the connector bar and the skate system are contemplated herein.

The length $L_{4000}$ of the connector bars may be adjustable. Thereby, the distance between skate systems 100 are adjusted by adjusting the length $L_{4000}$ of the connector bars. The connector bars may be adjustable to accommodate a variety of gondola systems. Moreover, the connector bars may be adjustable in the field to reduce the amount of coordination required prior to delivery to the jobsite and/or shipping. Some nominal dimensions of a connector bar may include connector bars of 30 inches, 3 feet, and/or 5 feet in length.

Figure 43:
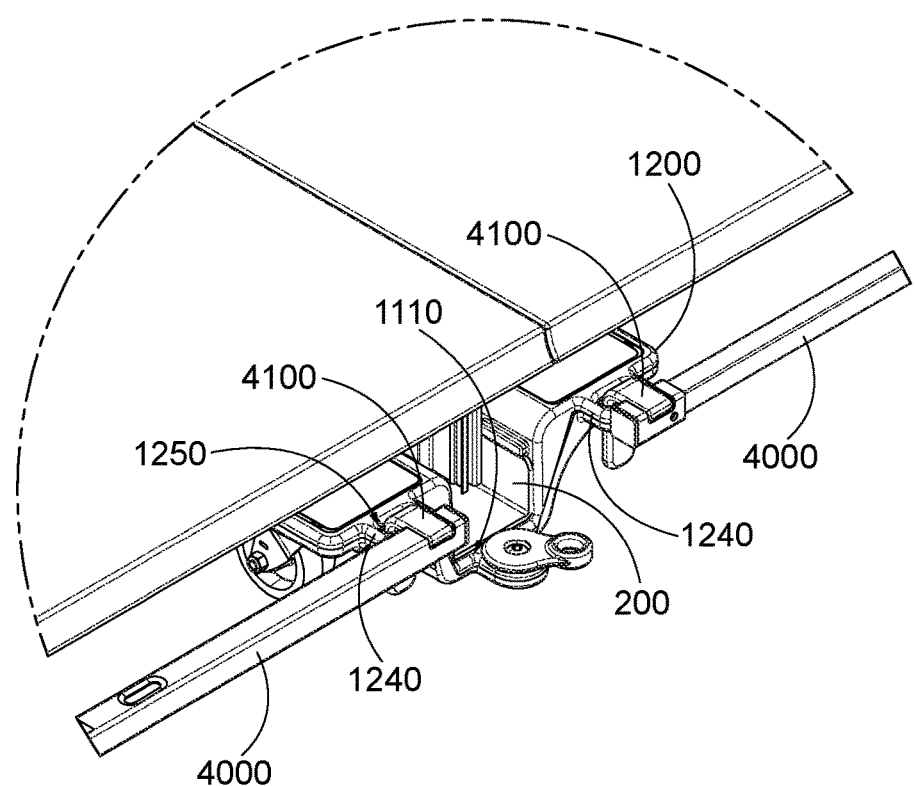
FIG. 43 is a detailed perspective view of a skate system, connector bars, and a gondola, in accordance with an example.
Figure 44:
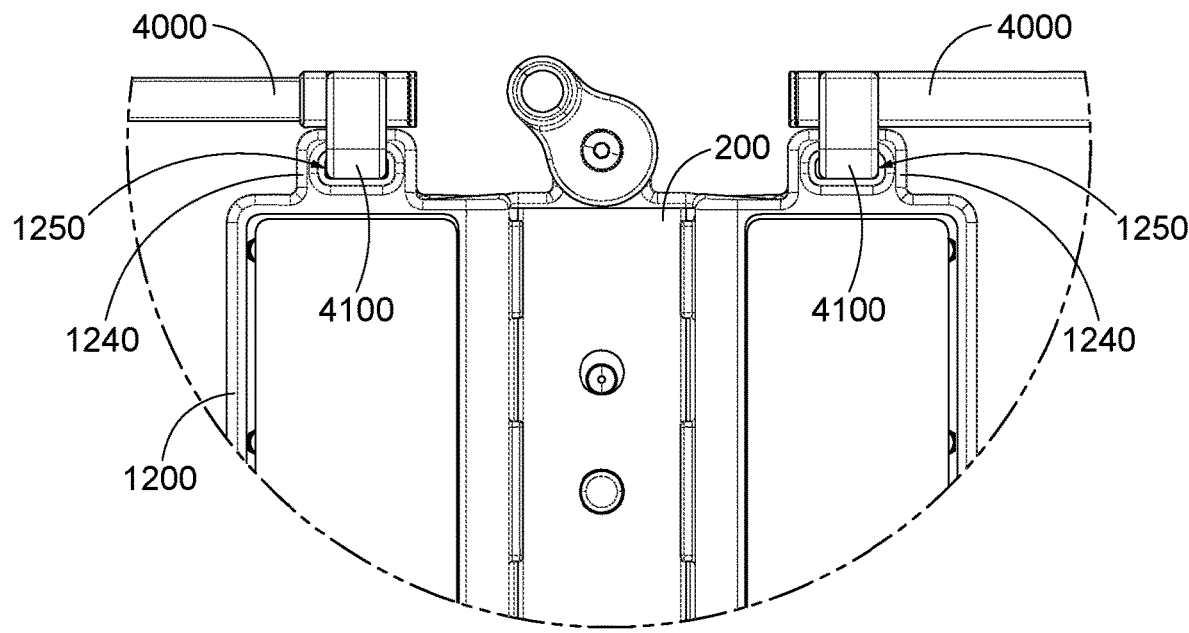
FIG. 44 is a detailed top view of a skate system, connector bars, and a gondola, in accordance with an example.
Figure 45:
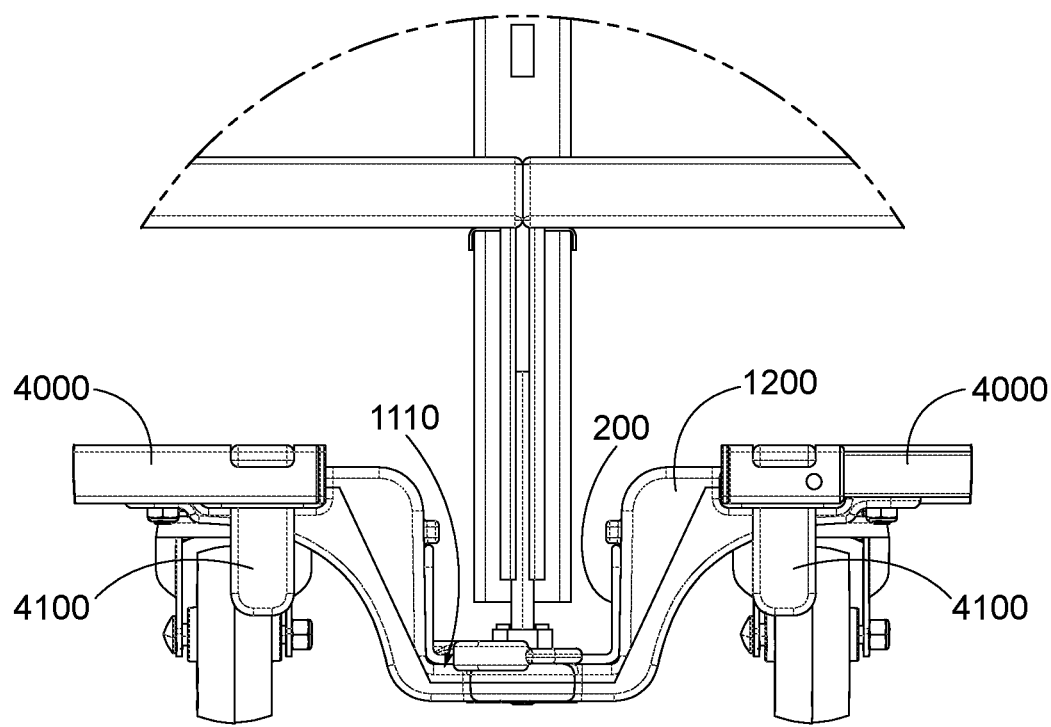
FIG. 45 is a detailed end view of a skate system, connector bars, and a gondola, in accordance with an example.
Figure 46:
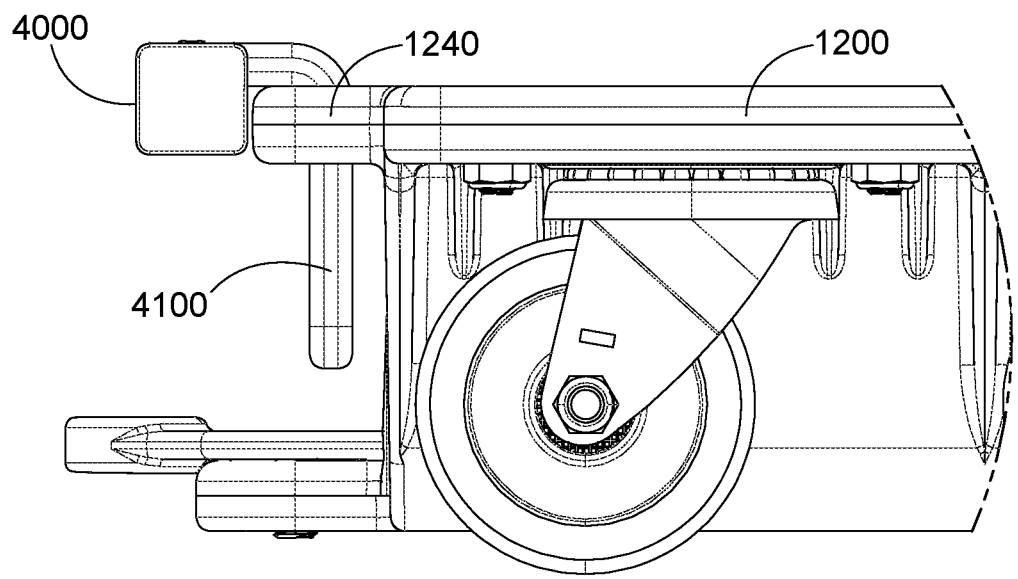
FIG. 46 is a detailed side view of a skate system, connector bars, and a gondola, in accordance with an example.

In the examples of FIGS. 35-39 the receiving aperture 1250 extends from an end of a skate 1000 of the skate system 100. By extending the receiving aperture 1250 from an end of the skate 1000 it may additionally extend beyond the perimeter of the gondola, thereby, allowing insertion of the insert hook 4100 into the receiving aperture 1250 without additionally engaging the gondola when the gondola is in place. In some examples, the skate systems 100 may be connected to one another by the connector bars 4000 prior to being inserted to the underside of a gondola. To this end, the connector bars 4000 extend between adjacent skate systems 100 without crossing a longitudinal member 200 and/or a bearing surface 1110 and thereby allowing the gondola access onto the longitudinal member 200 and/or the bearing surface 1110. The connector bar 4000 may additionally be perpendicular to the length of the longitudinal member 200. This is best illustrated by FIGS. 43-45. Once secured together by way of the connector bars 4000, multiple skate systems may be moved in unison without twisting, racking, or contorting the gondola moving system 10 and/or the gondola supported on the gondola moving system 10.

Figure 40:
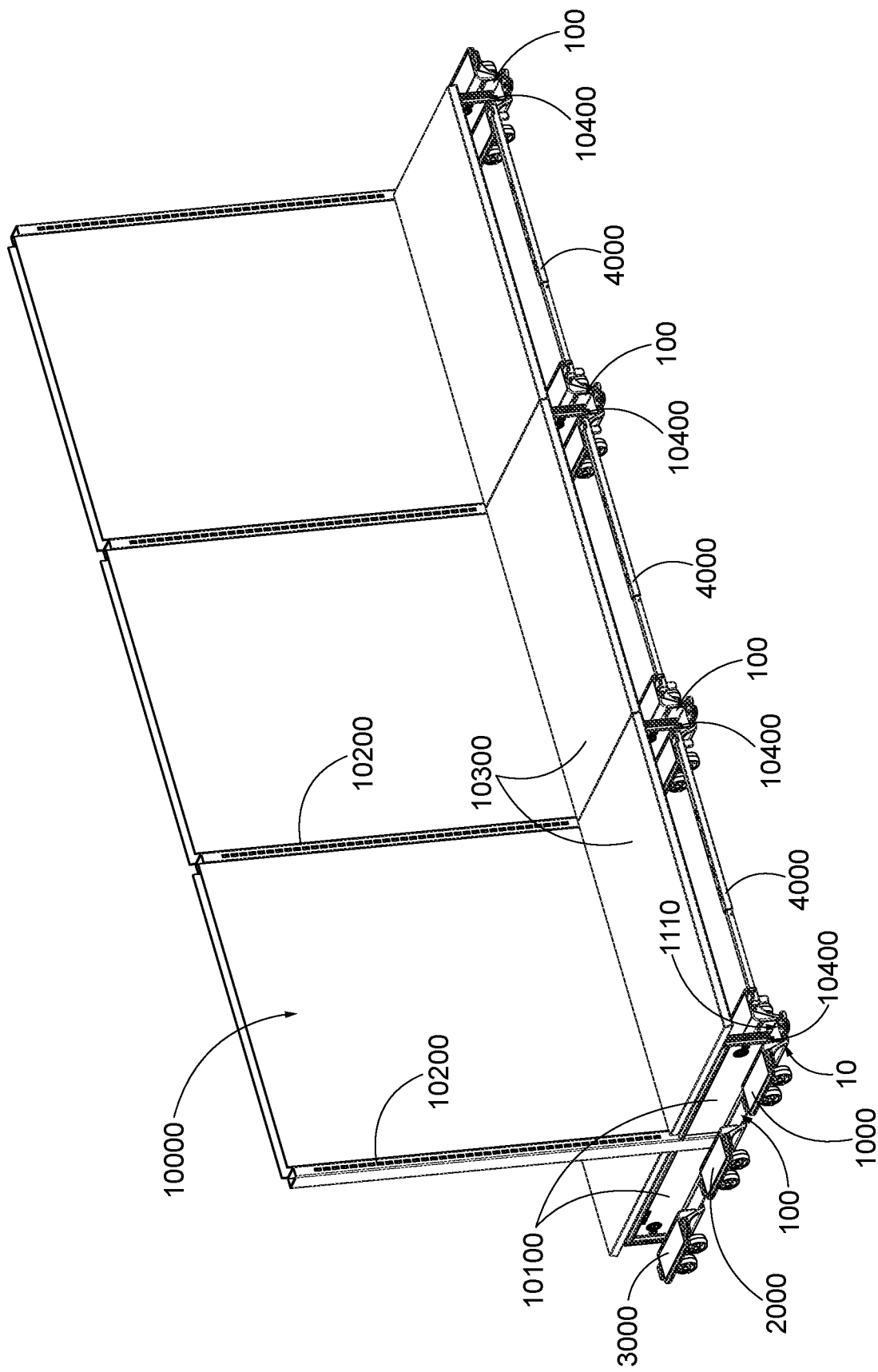
FIG. 40 is a perspective view of a gondola moving system and a gondola, in accordance with an example.
Figure 41:
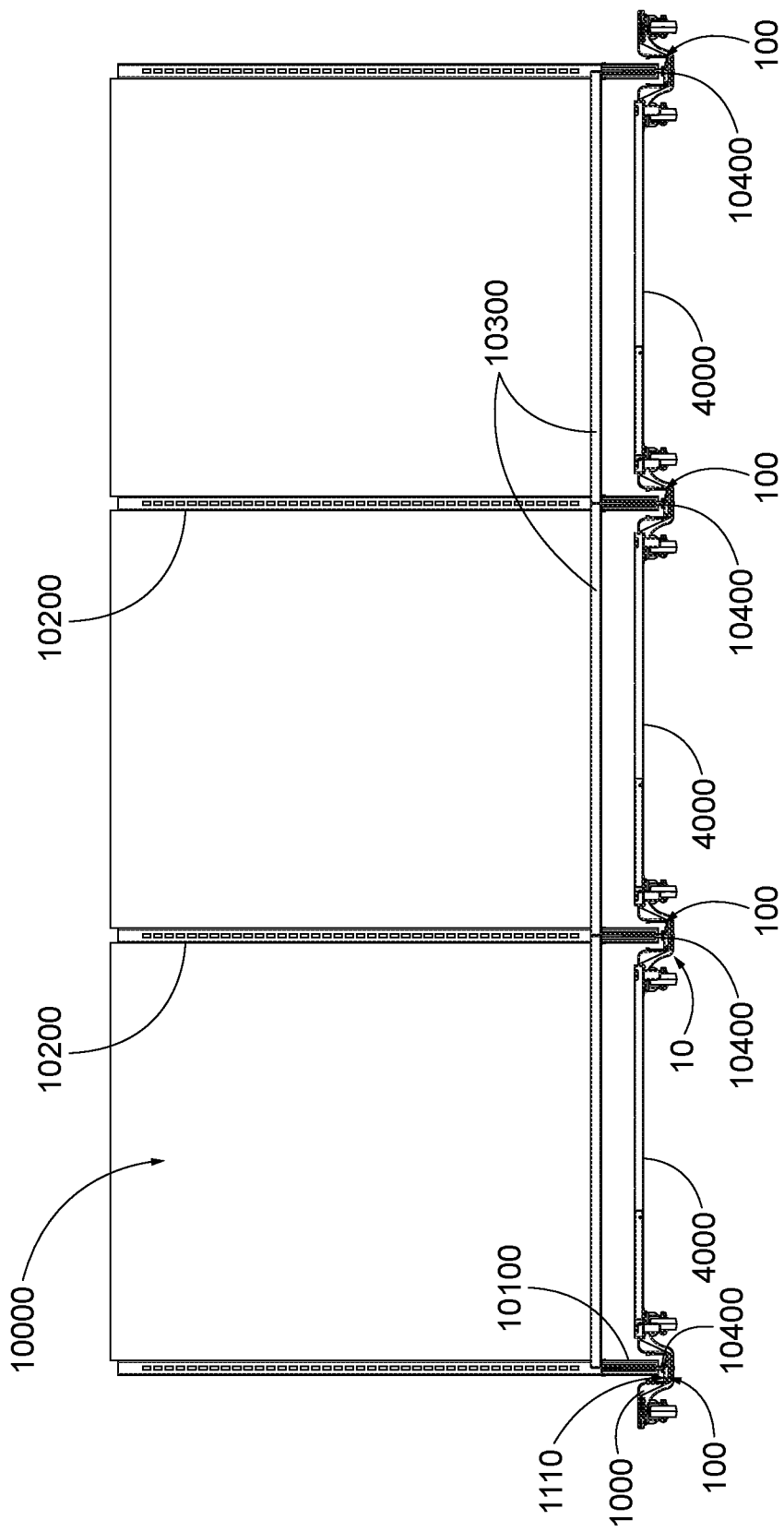
FIG. 41 is an end view of a gondola moving system and a gondola, in accordance with an example.
Figure 42:
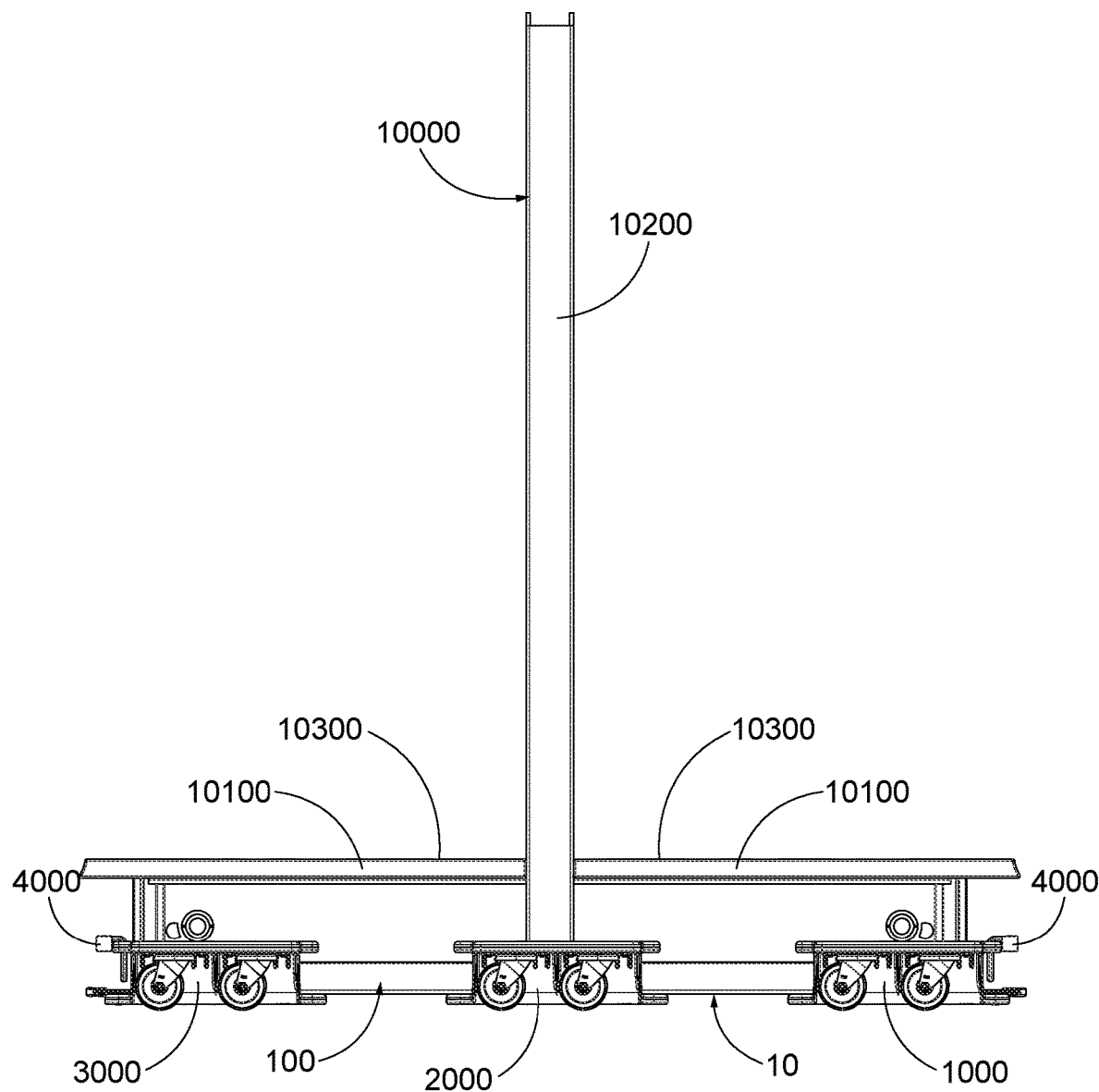
FIG. 42 is a side view of a gondola moving system and a gondola, in accordance with an example.

Turning now to FIGS. 40-42, a gondola moving system 10 comprising multiple skate systems 100 having a first skate 1000, a second skate 2000, and a third skate 3000 are illustrated. The gondola 10000 comprises base brackets 10100, uprights 10200, and shelves 10300. Feet 10400 further extend from the base brackets 10100. The feet 10400 of the gondola 10000 are each supported on a bearing surface 1110 of each of a first skate 1000, a second skate 2000, and a third skate 3000 (where the first skate 1000 is relied on as an exemplary example for a bearing surface 1110). Adjacent skate systems 100 are connected at adjacent ends by way of connector bars 4000 to form the gondola moving system 10. In this example, the entire gondola 10000 is positioned upon the gondola moving system 10 and additionally mobile upon the gondola moving system 10. A moving device 1600 may be further attached to an end skate by way of the pull ring providing for movement of the entire gondola moving system 10 and the gondola 10000 supported upon the gondola moving system 10. During movement, the connector bars 4000 maintain each skate system 100 in alignment.

Methods of Use and Assembly

A method for moving shelving units, or gondolas, is also disclosed herein. In a method for moving a gondola a first skate system is assembled. The first skate system comprises at least two skates connected along a length of a longitudinal member. The first skate system is assembled by inserting the longitudinal member through each of the at least two skates such that the longitudinal member is supported upon a bearing surface of a seat of each skate of the at least two skates. The longitudinal member is secured vertically within each skate of the at least two skates by one or more tabs formed to a top side of the skate. The longitudinal member is thereby secured within each skate between the one or more tabs and the seat of each skate.

Each skate of the at least two skates is then adjusted longitudinally along the length of the longitudinal member. A first skate may be positioned to a first longitudinal end of the longitudinal member while a second skate may be positioned to a second longitudinal end of the longitudinal member. Additionally skates may be provided and positioned between the first skate and the second skate along the length of the longitudinal member. Each skate may be evenly spaced along the longitudinal member. Each skate may additionally be positioned on the longitudinal member to receive a foot or structural member of the gondola. To secure each skate along the longitudinal member a locking mechanism may be provided at the seat of the skate to secure the skate to the longitudinal member. Examples of a locking mechanism are described above.

Once the first skate system is assembled, a lifting mechanism of a lifting device is positioned relative to a gondola and engages or attaches to a frame of the gondola. The lifting mechanism raises a lift face such that the load of the gondola is applied to lifting device. The lift face may further comprise a removable yoke wherein the yoke may be attached to the lift face by way of a dovetail structure. The yoke provides adaptability for various gondola configurations or feet and allows the lifting device to be interchangeably used across multiple gondola systems. The yoke may also be adjusted relative the lift face. For example, spacers may be provided to an underside of a yoke in order to adjust the elevation of the yoke upon the lifting device.

The lifting device may further comprise two opposing base structures where the lift face of the lift mechanism is centrally positioned between the two opposing base structures in a void there between. By way of the load of the gondola, as applied to the lifting device, a suspension system at each of the two opposing bases lowers the two opposing base structures to the ground, or floor. One example of a suspension system is spring-loaded axles at each wheel of the opposing base structures. Other examples of suspension systems are described in greater detail above. The lifting mechanism raises the lift face as well as the gondola within or to above the void formed between the two opposing base structures.

Once the lifting mechanism raises the lift face, as well as the gondola, within or to above the void, the first skate system is inserted in through the void, passing through the lifting device, and to below the gondola. The position of each skate of the first skate system is maintained by way of being connected to one another along the longitudinal member. Each skate of the at least two skates of the skate system are positioned to an underside of a respective foot of the gondola. The gondola is then lowered onto the first skate system wherein the one or more feet of the gondola are positioned and supported on a bearing surface of each of the at least two skates. The gondola is lowered by lowering the lifting mechanism. The longitudinal member may be a channel wherein, once lowered, the gondola is positioned within the channel of the longitudinal member such as, for example, a frame of the gondola is maintained within the channel. The lifting mechanism may raise and lower the gondola by way of a hydraulic unit driving a ram. In some examples, the ram may move the gondola in a vertical direction only.

The method for moving shelving units, or a gondola, may further comprise assembling a second skate system, same as the first. The lifting device may be removed from the gondola, even as the first skate system is supporting the gondola. The lifting device may be repositioned on the gondola wherein the lifting mechanism engages or is attached to the gondola for inserting the second skate system below the gondola, same as the first. Additionally or alternatively, additional lifting devices may be used. The second skate system may be installed parallel to the first skate system. One or more connector bars may be added to between the first skate system and the second skate system.

The method for moving shelving units, or gondolas, may further comprise removing all lifting devices from each of the skate systems. The gondola may then be moved across the ground, or floor, upon the first skate system and the second skate system. The first skate system and the second skate system may be moved by way of a pull ring. The pull ring may be rotatably connected to a pull ring receiver of one of the skates. Upon pulling the pull ring, casters of each skate rotate into a direction of travel and each skate system may be moved in the direction of travel by way of the rotatable pull ring and casters.

Once the shelving unit, or gondola, has been moved into a position, the gondola may remain upon each respective skate system for additional use at a later date. Alternatively, each respective skate system may be removed from the gondola for maintenance of the skate systems and/or for permanently placing the gondola in its new position. To remove the skate systems, the lifting device(s) again engage or are attached to the gondola. The lifting device raises the gondola from the skate system in the same manner the gondola was lifted from the ground, or floor, as previously described above. Once raised from the skate systems, the skate systems may then be removed from the underside of the gondola through the void in the lifting device. Once the skate systems are removed, the gondola may then be lowered to the ground, or floor, by way of the lifting device. Once securely positioned on the ground, or floor, all of the lifting device(s) may be removed from the gondola.

Upon removal from the gondola, the moving system may be disassembled. The one or more connector bars may be removed from each respective skate system. In some examples, this may be accomplished by removing each insert hook from a respective receiving aperture. The connector bars may be collapsible or adjustable for compact transport. Thereby, the connector bars are collapsed into a transport configuration. Each skate may be removed from the longitudinal member. In order to remove a skate from the longitudinal member a channel release button may be engaged to release a locking mechanism of the skate, by way of a leaf spring, from the longitudinal member. The longitudinal member may then slide laterally across the seat of the skate until it is removed from the skate. Once all of the skates are removed from the longitudinal member, the skate system has been disassembled. In other examples, the skate system may be transported fully assembled.

The terms "comprising," "including," and "having," as used in the claims and specification herein, shall be considered as indicating an open group that may include other elements not specified. The terms "a," "an," and the singular form of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things are intended. The terms "preferably," "preferred," "prefer," "optionally," "may," and similar terms are used to indicate that an item, condition or step being referred to is an optional (i.e., not required) feature of the examples.

While this invention has been described with reference to examples thereof, it shall be understood that such description is by way of illustration only and should not be construed as limiting the scope of the claimed examples. Accordingly, the scope and content of the examples are to be defined only by the terms of the following claims. Furthermore, it is understood that the features of any example discussed herein may be combined with one or more features of any one or more examples otherwise discussed or contemplated herein unless otherwise stated.

What is claimed is:

1. A lifting device for lifting a shelving unit, the lifting device comprising:
   a lifting mechanism supported on two opposing bases with a lift face of the lifting mechanism centrally positioned in a void between the two opposing bases, each base of the two opposing bases comprise a suspension system and at least two wheels wherein the suspension system has means to lower an elevation of each base of the two opposing bases as a load is applied to the lifting mechanism;
   wherein the suspension system lowers each opposing base to a ground surface as the lifting mechanism raises as the load is applied to the lifting mechanism.

2. The lifting device of claim 1 wherein a yoke is attached to the lift face of the lifting mechanism by a dovetail structure with means for the yoke to move vertically along a length of the dovetail structure.

3. The lifting device of claim 2 wherein the lifting mechanism moves the yoke by way of a ram extending from a hydraulic assembly wherein the hydraulic assembly is secured to a handle of the lifting device and the dovetail structure prevents a non-axial load from being applied to the ram.

4. The lifting device of claim 3 wherein the lifting mechanism moves the yoke in a vertical direction only.

5. The lifting device of claim 3 wherein the lifting mechanism maintains its elevation when the lifting mechanism is not in operation.

6. The lifting device of claim 2 wherein the yoke is removable from the dovetail structure of the lifting mechanism.

7. The lifting device of claim 1 wherein the lifting mechanism elevates the lifting face to above the void between the two opposing bases.

8. The lifting device of claim 1 wherein the two opposing bases are positioned at opposing sides of a foot of the shelving unit when the lifting mechanism is engaged with the shelving unit.

9. The lifting device of claim 1 wherein the lifting mechanism raises the shelving unit and allows an independent skate system to be inserted through the void to an underside of the elevated shelving unit.

10. The lifting device of claim 1 wherein the lifting mechanism lowers the shelving unit onto an independent skate system.

11. The lifting device of claim 10 wherein the lifting mechanism is separable from the shelving unit when the shelving unit is on the independent skate system.

12. The lifting device of claim 1 wherein the lifting mechanism is calibrated to move at an identical rate as a second lift mechanism of a second lifting device so that the load will remain balanced as the load is applied to the lifting mechanism and the second lifting mechanism at different respective locations on the load.

13. The lifting device of claim 1 wherein the two opposing bases comprise a rubber surface.

14. The lifting device of claim 1 wherein the at least two wheels of each base of the two opposing bases are multi-directional wheels.

15. The lifting device of claim 1 wherein upon lowering each opposing base structure to the ground surface the base structure rests on the ground surface and immobilizes the lifting device.

16. The lifting device of claim 15 wherein the lifting mechanism remains operational when the lifting device is otherwise immobilized.

17. The lifting device of claim 1 wherein, as the load is applied, resistive forces of the suspension system are overcome to lower the elevation of each opposing base onto the ground surface.

18. The lifting device of claim 1 wherein the suspension system comprises one or more spring-loaded axles positioned between one or more wheels of the at least two wheels and the respective base of the two opposing base structures.

19. The lifting device of claim 18 wherein the one or more spring-loaded axles further comprise a pivot device.

20. A lifting device for lifting a shelving unit, the lifting device comprising:
a lifting mechanism supported on two opposing bases with a lift face of the lifting mechanism centrally positioned in a void between the two opposing bases, each base of the two opposing bases comprise a suspension system and at least two wheels wherein the suspension system has means to lower an elevation of each base of the two opposing bases as a load is applied to the lifting mechanism;
wherein, as the load is applied, resistive forces of the suspension system are overcome to lower the elevation of each opposing base onto a ground surface.

* * * * *